(12) United States Patent
Kosecki et al.

(10) Patent No.: US 8,297,508 B2
(45) Date of Patent: Oct. 30, 2012

(54) DATA COLLECTION SYSTEM HAVING EIR TERMINAL INTERFACE NODE

(75) Inventors: James Kosecki, Syracuse, NY (US); Aldo Mario Caballero, Charlotte, NC (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 0 days.

(21) Appl. No.: 13/233,598

(22) Filed: Sep. 15, 2011

(65) Prior Publication Data
US 2012/0000984 A1   Jan. 5, 2012

Related U.S. Application Data

(62) Division of application No. 12/979,147, filed on Dec. 27, 2010, now Pat. No. 8,025,233, which is a division of application No. 11/893,603, filed on Aug. 16, 2007, now Pat. No. 7,857,222.

(51) Int. Cl.
*G06K 7/08* (2006.01)
(52) U.S. Cl. .................. 235/449; 235/380; 235/493
(58) Field of Classification Search ............ 235/462.14, 235/462.15; 340/539.11, 539.19
See application file for complete search history.

(56) References Cited

U.S. PATENT DOCUMENTS

| | | | |
|---|---|---|---|
| 5,109,486 A | 4/1992 | Seymour | |
| 5,261,044 A | 11/1993 | Dev et al. | |
| 5,402,316 A | 3/1995 | Volz et al. | |
| 5,463,742 A | 10/1995 | Kobayashi | |
| 5,504,921 A | 4/1996 | Dev et al. | |
| 5,546,145 A | 8/1996 | Bernardi et al. | |
| 5,552,959 A | 9/1996 | Penniman et al. | |
| 5,579,001 A | 11/1996 | Dempsey et al. | |
| 5,579,529 A | 11/1996 | Terrell et al. | |
| 5,579,775 A | 12/1996 | Dempsey et al. | |
| 5,587,560 A | 12/1996 | Crooks et al. | |
| 5,615,625 A | 4/1997 | Cassidy et al. | |
| 5,640,953 A | 6/1997 | Bishop et al. | |
| 5,655,081 A | 8/1997 | Bonnell et al. | |
| 5,687,734 A | 11/1997 | Dempsey et al. | |
| 5,724,509 A | 3/1998 | Starkweather et al. | |
| 5,752,917 A | 5/1998 | Fuchs | |
| 5,774,793 A | 6/1998 | Cooper et al. | |
| 5,793,967 A | 8/1998 | Simciak et al. | |
| 5,798,951 A | 8/1998 | Cho et al. | |
| 5,805,442 A | 9/1998 | Crater et al. | |
| 5,815,735 A | 9/1998 | Baker | |

(Continued)

FOREIGN PATENT DOCUMENTS
WO      0217073 A1    2/2002
(Continued)

OTHER PUBLICATIONS
Hand Held Products Model Selection Guide, URL: http://www.handheld.com/site.aspx/na/en/product_center/hardware/?Product+74, 1 page, Mar. 6, 2008.
(Continued)

*Primary Examiner* — Kristy A Haupt
(74) *Attorney, Agent, or Firm* — Heslin Rothenberg Farley & Mesiti P.C.

(57) ABSTRACT

A network accessible node that facilitates management of a fleet of portable communication devices (EIR terminal), including portable data terminals and/or barcode readers, by directing performance of software upgrade and/or configuration update actions by one or more members of the fleet of EIR terminals.

10 Claims, 12 Drawing Sheets

U.S. PATENT DOCUMENTS

| | | | |
|---|---|---|---|
| 5,819,110 A | 10/1998 | Motoyama | |
| 5,825,617 A | 10/1998 | Kochis et al. | |
| 5,835,733 A | 11/1998 | Walsh et al. | |
| 5,848,253 A | 12/1998 | Walsh et al. | |
| 5,862,349 A | 1/1999 | Cho et al. | |
| 5,867,714 A | 2/1999 | Todd et al. | |
| 5,875,312 A | 2/1999 | Walsh et al. | |
| 5,878,256 A | 3/1999 | Bealkowski et al. | |
| 5,889,964 A | 3/1999 | Cho et al. | |
| 5,921,459 A | 7/1999 | Heraly et al. | |
| 5,931,909 A | 8/1999 | Taylor | |
| 5,935,244 A | 8/1999 | Swamy et al. | |
| 5,941,965 A | 8/1999 | Moroz et al. | |
| 5,961,337 A | 10/1999 | Kordes | |
| 5,978,591 A | 11/1999 | Bartholomew et al. | |
| 6,032,202 A | 2/2000 | Lea et al. | |
| 6,037,788 A | 3/2000 | Krajec et al. | |
| 6,049,454 A | 4/2000 | Howell et al. | |
| 6,070,012 A | 5/2000 | Eitner et al. | |
| 6,085,244 A | 7/2000 | Wookey | |
| 6,088,752 A | 7/2000 | Ahern | |
| 6,091,602 A | 7/2000 | Helot | |
| 6,098,097 A | 8/2000 | Dean et al. | |
| 6,108,717 A | 8/2000 | Kimura et al. | |
| 6,109,039 A | 8/2000 | Hougham et al. | |
| 6,142,593 A | 11/2000 | Kim et al. | |
| 6,151,643 A | 11/2000 | Cheng et al. | |
| 6,158,430 A | 12/2000 | Pfeiffer et al. | |
| 6,160,719 A | 12/2000 | May et al. | |
| 6,161,133 A | 12/2000 | Kikinis | |
| 6,171,559 B1 | 1/2001 | Sanders et al. | |
| 6,188,572 B1 | 2/2001 | Liao et al. | |
| 6,195,265 B1 | 2/2001 | Choi et al. | |
| 6,199,108 B1 | 3/2001 | Casey et al. | |
| 6,202,209 B1 | 3/2001 | Bartholomew et al. | |
| 6,226,739 B1 | 5/2001 | Eagle | |
| 6,240,297 B1 | 5/2001 | Jadoul et al. | |
| 6,247,074 B1 | 6/2001 | Shin et al. | |
| 6,256,691 B1 | 7/2001 | Moroz et al. | |
| 6,267,475 B1 | 7/2001 | Lee et al. | |
| 6,279,059 B1 | 8/2001 | Ludtke et al. | |
| 6,279,154 B1 | 8/2001 | Davis | |
| 6,285,911 B1 | 9/2001 | Watts, Jr. et al. | |
| 6,297,963 B1 | 10/2001 | Fogle | |
| 6,301,106 B1 | 10/2001 | Helot et al. | |
| 6,311,321 B1 | 10/2001 | Agnihotri et al. | |
| 6,324,692 B1 | 11/2001 | Fiske | |
| 6,330,597 B2 | 12/2001 | Collin et al. | |
| 6,341,274 B1 | 1/2002 | Leon | |
| 6,341,320 B1 | 1/2002 | Watts, Jr. et al. | |
| 6,360,362 B1 | 3/2002 | Fichtner et al. | |
| 6,378,128 B1 | 4/2002 | Edelstein et al. | |
| 6,407,335 B1 | 6/2002 | Franklin-Lees et al. | |
| 6,407,915 B1 | 6/2002 | Derocher et al. | |
| 6,425,126 B1 | 7/2002 | Branson et al. | |
| 6,442,639 B1 | 8/2002 | McElhattan et al. | |
| 6,452,325 B1 | 9/2002 | Dupont | |
| 6,457,076 B1 | 9/2002 | Cheng et al. | |
| 6,461,181 B1 | 10/2002 | Goh et al. | |
| 6,467,088 B1 | 10/2002 | alSafadi et al. | |
| 6,477,588 B1 | 11/2002 | Yerazunis et al. | |
| 6,484,315 B1 | 11/2002 | Ziese | |
| 6,489,932 B1 | 12/2002 | Chitturi et al. | |
| 6,505,121 B1 | 1/2003 | Russell | |
| 6,506,009 B1 | 1/2003 | Nulman et al. | |
| 6,511,031 B2 | 1/2003 | Lin | |
| 6,519,143 B1 | 2/2003 | Goko et al. | |
| 6,539,358 B1 | 3/2003 | Coon et al. | |
| 6,542,943 B2 | 4/2003 | Cheng et al. | |
| 6,558,049 B1 | 5/2003 | Shin | |
| 6,560,643 B1 | 5/2003 | Shepherd et al. | |
| 6,584,336 B1 | 6/2003 | Ali et al. | |
| 6,584,499 B1 | 6/2003 | Jantz et al. | |
| 6,587,874 B1 | 7/2003 | Golla et al. | |
| 6,593,528 B2 | 7/2003 | Franklin-Lees et al. | |
| 6,594,534 B1 | 7/2003 | Crowell | |
| 6,606,678 B1 | 8/2003 | Nakamura et al. | |
| 6,614,979 B2 | 9/2003 | Bourdeau et al. | |
| 6,615,405 B1 | 9/2003 | Goldman et al. | |
| 6,628,517 B1 | 9/2003 | Helot et al. | |
| 6,633,482 B2 | 10/2003 | Rode | |
| 6,658,659 B2 | 12/2003 | Hiller et al. | |
| 6,668,296 B1 | 12/2003 | Dougherty et al. | |
| 6,683,786 B2 | 1/2004 | Yin et al. | |
| 6,684,241 B1 | 1/2004 | Sandick et al. | |
| 6,697,032 B2 | 2/2004 | Chitturi et al. | |
| 6,722,192 B2 | 4/2004 | Benedict et al. | |
| 6,725,260 B1 | 4/2004 | Philyaw | |
| 6,725,281 B1 | 4/2004 | Zintel et al. | |
| 6,728,956 B2 | 4/2004 | Ono et al. | |
| 6,742,025 B2 | 5/2004 | Jennery et al. | |
| 6,751,681 B2 | 6/2004 | Torii et al. | |
| 6,754,723 B2 | 6/2004 | Kato et al. | |
| 6,760,761 B1 | 7/2004 | Sciacca | |
| 6,763,403 B2 | 7/2004 | Cheng et al. | |
| 6,766,175 B2 | 7/2004 | Uchiyama | |
| 6,766,956 B1 | 7/2004 | Boylan, III et al. | |
| 6,770,028 B1 | 8/2004 | Ali et al. | |
| 6,772,264 B1 | 8/2004 | Dayan et al. | |
| 6,778,824 B2 | 8/2004 | Wonak et al. | |
| 6,779,068 B2 | 8/2004 | Kim et al. | |
| 6,784,855 B2 | 8/2004 | Matthews et al. | |
| 6,806,813 B1 | 10/2004 | Cheng et al. | |
| 6,832,082 B1 | 12/2004 | Ramaswamy et al. | |
| 6,832,373 B2 | 12/2004 | O'Neill | |
| 6,833,787 B1 | 12/2004 | Levi | |
| 6,833,989 B2 | 12/2004 | Helot et al. | |
| 6,850,158 B1 | 2/2005 | Williams | |
| 6,854,112 B2 | 2/2005 | Crespo et al. | |
| 6,857,013 B2 | 2/2005 | Ramberg et al. | |
| 6,863,210 B2 | 3/2005 | Becker et al. | |
| 6,864,891 B2 | 3/2005 | Myers | |
| 6,868,468 B2 | 3/2005 | Boz et al. | |
| 6,886,104 B1 | 4/2005 | McClurg et al. | |
| 6,889,263 B2 | 5/2005 | Motoyama | |
| 6,895,261 B1 | 5/2005 | Palamides | |
| 6,895,445 B2 | 5/2005 | Ying et al. | |
| 6,898,080 B2 | 5/2005 | Yin et al. | |
| 6,904,457 B2 | 6/2005 | Goodman | |
| 6,907,603 B2 | 6/2005 | Scott | |
| 6,915,514 B1 | 7/2005 | Machida et al. | |
| 6,920,631 B2 | 7/2005 | Delo | |
| 6,928,493 B2 | 8/2005 | Motoyama | |
| 6,944,854 B2 | 9/2005 | Kehne et al. | |
| 6,944,858 B2 | 9/2005 | Luu | |
| 6,954,142 B2 | 10/2005 | Lieberman et al. | |
| 6,955,517 B2 | 10/2005 | Nulman et al. | |
| 6,959,172 B2 | 10/2005 | Becker et al. | |
| 6,961,586 B2 | 11/2005 | Barbosa et al. | |
| 6,966,058 B2 | 11/2005 | Earl et al. | |
| 6,968,550 B2 | 11/2005 | Branson et al. | |
| 6,970,952 B2 | 11/2005 | Motoyama | |
| 6,973,799 B2 | 12/2005 | Kuehl et al. | |
| 6,976,062 B1 | 12/2005 | Denby et al. | |
| 6,981,086 B2 | 12/2005 | Wetzel et al. | |
| 6,987,988 B2 | 1/2006 | Uchiyama | |
| 6,990,549 B2 | 1/2006 | Main et al. | |
| 6,990,660 B2 | 1/2006 | Moshir et al. | |
| 6,993,615 B2 | 1/2006 | Falcon | |
| 6,993,760 B2 | 1/2006 | Peev et al. | |
| 6,996,634 B1 | 2/2006 | Herrod et al. | |
| 6,999,898 B2 | 2/2006 | King et al. | |
| 7,000,228 B2 | 2/2006 | Mortazavi | |
| 7,003,560 B1 | 2/2006 | Mullen et al. | |
| 7,013,331 B2 | 3/2006 | Das | |
| 7,020,571 B2 | 3/2006 | Lee et al. | |
| 7,024,189 B2 | 4/2006 | Wonak et al. | |
| 7,039,688 B2 | 5/2006 | Matsuda et al. | |
| 7,043,537 B1 | 5/2006 | Pratt | |
| 7,054,423 B2 | 5/2006 | Nebiker et al. | |
| 7,054,977 B2 | 5/2006 | Kadambi et al. | |
| 7,069,006 B2 | 6/2006 | Wonak | |
| 7,072,675 B1 | 7/2006 | Kanakubo | |
| 7,076,536 B2 | 7/2006 | Chiloyan et al. | |
| 7,080,371 B1 | 7/2006 | Arnaiz et al. | |
| 7,085,805 B1 | 8/2006 | Ruberg et al. | |
| 7,085,824 B2 | 8/2006 | Forth et al. | |

| | | |
|---|---|---|
| 7,086,049 B2 | 8/2006 | Goodman |
| 7,089,551 B2 | 8/2006 | Fordemwalt et al. |
| 7,099,152 B2 | 8/2006 | Gasbarro et al. |
| 7,100,271 B2 | 9/2006 | Baulier et al. |
| 7,107,380 B1 | 9/2006 | Mohan |
| 7,111,055 B2 | 9/2006 | Falkner |
| 7,114,021 B2 | 9/2006 | Seshadri |
| 7,117,239 B1 | 10/2006 | Hansen |
| 7,117,286 B2 | 10/2006 | Falcon |
| 7,130,896 B2 | 10/2006 | Engel et al. |
| 7,133,939 B1 | 11/2006 | Desai et al. |
| 7,149,792 B1 | 12/2006 | Hansen et al. |
| 7,159,016 B2 | 1/2007 | Baker |
| 7,185,014 B1 | 2/2007 | Hansen |
| 7,188,160 B2 | 3/2007 | Champagne et al. |
| 7,188,171 B2 | 3/2007 | Srinivasan et al. |
| 7,191,435 B2 | 3/2007 | Lau et al. |
| 7,194,526 B2 | 3/2007 | Kanemitsu et al. |
| 7,216,343 B2 | 5/2007 | Das et al. |
| 7,272,711 B2 | 9/2007 | Suda et al. |
| 7,289,995 B2 | 10/2007 | Motoyama et al. |
| 7,290,258 B2 | 10/2007 | Steeb et al. |
| 7,316,013 B2 | 1/2008 | Kawano et al. |
| 7,857,222 B2 | 12/2010 | Kosecki et al. |
| 2001/0042112 A1 | 11/2001 | Slivka et al. |
| 2002/0073304 A1 | 6/2002 | Marsh et al. |
| 2002/0083160 A1 | 6/2002 | Middleton |
| 2002/0086703 A1 | 7/2002 | Dimenstein et al. |
| 2002/0087392 A1 | 7/2002 | Stevens |
| 2002/0087668 A1 | 7/2002 | San Martin et al. |
| 2002/0087960 A1 | 7/2002 | Hisatake |
| 2002/0092008 A1 | 7/2002 | Kehne et al. |
| 2002/0092013 A1 | 7/2002 | Delo |
| 2002/0094208 A1 | 7/2002 | Palumbo |
| 2002/0095484 A1 | 7/2002 | Pagani et al. |
| 2002/0100036 A1 | 7/2002 | Moshir et al. |
| 2002/0109665 A1 | 8/2002 | Matthews et al. |
| 2002/0129350 A1 | 9/2002 | Wang et al. |
| 2002/0129355 A1 | 9/2002 | Velten et al. |
| 2002/0147974 A1 | 10/2002 | Wookey |
| 2002/0184349 A1 | 12/2002 | Manukyan |
| 2002/0184350 A1 | 12/2002 | Chen |
| 2002/0187024 A1 | 12/2002 | Nulman |
| 2002/0191940 A1 | 12/2002 | Bourdeau |
| 2002/0198969 A1 | 12/2002 | Engel et al. |
| 2003/0018694 A1 | 1/2003 | Chen et al. |
| 2003/0031539 A1 | 2/2003 | Nulman et al. |
| 2003/0046675 A1 | 3/2003 | Cheng et al. |
| 2003/0051235 A1 | 3/2003 | Simpson |
| 2003/0059022 A1 | 3/2003 | Nebiker et al. |
| 2003/0084436 A1 | 5/2003 | Berger et al. |
| 2003/0088651 A1 | 5/2003 | Wilson |
| 2003/0097427 A1 | 5/2003 | Parry |
| 2003/0111245 A1 | 6/2003 | Haggerty |
| 2003/0154471 A1 | 8/2003 | Teachman et al. |
| 2003/0188306 A1 | 10/2003 | Harris et al. |
| 2003/0198015 A1 | 10/2003 | Vogt |
| 2003/0217357 A1 | 11/2003 | Parry |
| 2003/0217358 A1 | 11/2003 | Thurston et al. |
| 2003/0221190 A1 | 11/2003 | Deshpande et al. |
| 2003/0225939 A1 | 12/2003 | Ying et al. |
| 2004/0002943 A1 | 1/2004 | Merrill et al. |
| 2004/0015949 A1 | 1/2004 | Taylor |
| 2004/0020974 A1 | 2/2004 | Becker et al. |
| 2004/0024933 A1 | 2/2004 | Billington et al. |
| 2004/0049233 A1 | 3/2004 | Edwards |
| 2004/0050247 A1 | 3/2004 | Topping |
| 2004/0083471 A1 | 4/2004 | Nam et al. |
| 2004/0098571 A1 | 5/2004 | Falcon |
| 2004/0103172 A1 | 5/2004 | Chen et al. |
| 2004/0123281 A1 | 6/2004 | Olrik et al. |
| 2004/0127210 A1 | 7/2004 | Shostak |
| 2004/0139757 A1 | 7/2004 | Kuehl et al. |
| 2004/0143032 A1 | 7/2004 | Auschra et al. |
| 2004/0148600 A1 | 7/2004 | Hoshino |
| 2004/0154014 A1 | 8/2004 | Bunger |
| 2004/0168167 A1 | 8/2004 | Ono |
| 2004/0177380 A1 | 9/2004 | Hamel et al. |
| 2004/0181593 A1 | 9/2004 | Kanojia et al. |
| 2004/0192329 A1 | 9/2004 | Barbosa et al. |
| 2004/0199615 A1 | 10/2004 | Philyaw |
| 2004/0205709 A1 | 10/2004 | Hiltgen et al. |
| 2004/0210897 A1 | 10/2004 | Brockway et al. |
| 2004/0212822 A1 | 10/2004 | Schinner |
| 2004/0216099 A1 | 10/2004 | Okita et al. |
| 2004/0235532 A1 | 11/2004 | Matthews et al. |
| 2004/0243991 A1 | 12/2004 | Gustafson et al. |
| 2004/0243995 A1 | 12/2004 | Sheehy |
| 2004/0255023 A1 | 12/2004 | Motoyama et al. |
| 2004/0268340 A1 | 12/2004 | Steeb et al. |
| 2005/0044544 A1 | 2/2005 | Slivka et al. |
| 2005/0050538 A1 | 3/2005 | Kawamata et al. |
| 2005/0052156 A1 | 3/2005 | Liebenow |
| 2005/0060862 A1 | 3/2005 | Baulier |
| 2005/0065822 A1 | 3/2005 | Ying et al. |
| 2005/0086328 A1 | 4/2005 | Landram et al. |
| 2005/0093821 A1 | 5/2005 | Massie et al. |
| 2005/0097543 A1 | 5/2005 | Hirayama |
| 2005/0097544 A1 | 5/2005 | Kim |
| 2005/0108700 A1 | 5/2005 | Chen et al. |
| 2005/0132348 A1 | 6/2005 | Meulemans et al. |
| 2005/0132349 A1 | 6/2005 | Roberts et al. |
| 2005/0132350 A1 | 6/2005 | Markley et al. |
| 2005/0132351 A1 | 6/2005 | Randall et al. |
| 2005/0144612 A1 | 6/2005 | Wang et al. |
| 2005/0144614 A1 | 6/2005 | Moslander et al. |
| 2005/0159847 A1 | 7/2005 | Shah et al. |
| 2005/0204353 A1 | 9/2005 | Ji |
| 2005/0210458 A1 | 9/2005 | Moriyama et al. |
| 2005/0210459 A1 | 9/2005 | Henderson et al. |
| 2005/0210466 A1 | 9/2005 | Carter et al. |
| 2005/0223372 A1 | 10/2005 | Borchers |
| 2005/0223373 A1 | 10/2005 | Gage et al. |
| 2005/0229171 A1 | 10/2005 | Henry et al. |
| 2005/0235076 A1 | 10/2005 | Winarski et al. |
| 2005/0246703 A1 | 11/2005 | Ahonen |
| 2005/0251799 A1 | 11/2005 | Wang |
| 2005/0254776 A1 | 11/2005 | Morrison et al. |
| 2005/0257205 A1 | 11/2005 | Costea et al. |
| 2005/0257209 A1 | 11/2005 | Adams et al. |
| 2005/0273229 A1 | 12/2005 | Steinmeier et al. |
| 2005/0278001 A1 | 12/2005 | Qin et al. |
| 2006/0010437 A1 | 1/2006 | Marolia |
| 2006/0013646 A1 | 1/2006 | Baulier et al. |
| 2006/0029489 A1 | 2/2006 | Nulman et al. |
| 2006/0031617 A1 | 2/2006 | Falcon |
| 2006/0031828 A1 | 2/2006 | Won et al. |
| 2006/0041881 A1 | 2/2006 | Adkasthala |
| 2006/0049677 A1 | 3/2006 | Lawrence et al. |
| 2006/0069813 A1 | 3/2006 | Biamonte et al. |
| 2006/0070055 A1 | 3/2006 | Hodder et al. |
| 2006/0082965 A1 | 4/2006 | Walker et al. |
| 2006/0106965 A1 | 5/2006 | Falcon |
| 2006/0130037 A1* | 6/2006 | Mackay ..................... 717/168 |
| 2006/0132964 A1 | 6/2006 | Lau et al. |
| 2006/0136893 A1 | 6/2006 | Blossom et al. |
| 2006/0142129 A1 | 6/2006 | Siaperas |
| 2006/0149321 A1 | 7/2006 | Merry et al. |
| 2006/0149322 A1 | 7/2006 | Merry et al. |
| 2006/0149323 A1 | 7/2006 | Merry et al. |
| 2006/0150177 A1 | 7/2006 | Liu et al. |
| 2006/0156302 A1 | 7/2006 | Yamamoto et al. |
| 2006/0168578 A1 | 7/2006 | Vorlicek |
| 2006/0168581 A1 | 7/2006 | Goger et al. |
| 2006/0172873 A1 | 8/2006 | Beard |
| 2006/0179431 A1 | 8/2006 | Devanathan et al. |
| 2006/0200812 A1 | 9/2006 | Mizutani et al. |
| 2006/0206888 A1 | 9/2006 | Mavrinac et al. |
| 2006/0218545 A1 | 9/2006 | Taguchi |
| 2006/0236518 A1 | 10/2006 | Baulier |
| 2006/0238384 A1 | 10/2006 | Hess et al. |
| 2006/0248522 A1 | 11/2006 | Lakshminarayanan et al. |
| 2006/0248524 A1* | 11/2006 | Seely ..................... 717/174 |
| 2007/0006207 A1 | 1/2007 | Appaji |
| 2007/0006213 A1 | 1/2007 | Shahidzadeh et al. |
| 2007/0006214 A1 | 1/2007 | Dubal et al. |
| 2007/0038990 A1 | 2/2007 | White et al. |
| 2007/0055969 A1 | 3/2007 | Yang |

| | | | |
|---|---|---|---|
| 2007/0055970 A1 | 3/2007 | Sakuda et al. |
| 2007/0074201 A1 | 3/2007 | Lee |
| 2007/0083630 A1 | 4/2007 | Roth et al. |
| 2007/0169073 A1 | 7/2007 | O'Neill et al. |
| 2007/0169089 A1 | 7/2007 | Bantz et al. |
| 2007/0169090 A1 | 7/2007 | Kang |
| 2007/0169092 A1 | 7/2007 | Lee |
| 2007/0169093 A1 | 7/2007 | Logan et al. |
| 2007/0174834 A1 | 7/2007 | Purkeypile et al. |
| 2007/0220505 A1 | 9/2007 | Bukovec et al. |
| 2007/0234331 A1 | 10/2007 | Schow et al. |
| 2007/0245333 A1 | 10/2007 | Ferlitsch |

FOREIGN PATENT DOCUMENTS

| | | |
|---|---|---|
| WO | 2005033964 A1 | 4/2005 |

OTHER PUBLICATIONS

Hand Held Products MSM (Mobile Systems Manager) Administrator's Guide, Version 1.1, Hand Held Products, Inc., 700 Visions Drive, Skaneateles Falls, NY 13153, May 2005, 320 pages.

Hand Held Products Inc., Dolphin 7400 Net Base Charging Communication Cradle, Product Specifications, 2 pages, 2005.

Hand Held Products, Inc., Dolphin Mobile Intellibase Communications-Charging Cradle, Product Specifications, 2 pages, 2005.

Hand Held Products, Inc., HHP Dolphin 7400 Batch Mobile Computer Product Specifications, URL: http://www.amerbar.com/catalog/dolphin_7400.asp, 5 pages, Nov. 28, 2006.

Industrial Scientific Corporation, Industrial Scientific DS2 Docking Station description sheet, URL: http://www.globalspec.com/FeaturedProducts/Detail/IndustrialScientific/DS2_Docking_s Station/10809/0, 1 page, Mar. 6, 2008.

Industrial Scientific Corporation, Industrial Scientific DS2 Docking Station product brochure, URL: http://www.airmet.com.au/files/documents/DS2_Lit.pdf., 2 pages, Mar. 6, 2008.

Industrial Scientific Corporation, Industrial Scientific DS2 Docking Station specification sheet, URL: http://www.airmet.com.au/files/documetns/DS2.sub,—Specds.pdf, 1 page, Mar. 6, 2008.

Industrial Scientific Corporation, Industrial Scientific DS2 Docking Station specification sheet, URL: http://www.airmet.com.au/files/documents/DS2_Specs.pdf, 1 page, Mar. 6, 2008.

Industrial Scientific Corporation, Industrial Scientific DS2 Docketing Station, URL: www.indsci.com/products, 5 pages, Apr. 18, 2007.

JADAK Technologies, 2020-5B Communication and Charging Cradle, product detail sheet, URL: http://www.jadatech.com/products/product.cfm?prod+1071, 1 page, Mar. 6, 2008.

JADAK Technologies, AppForge Enterprise Developers Suite, product detail sheets, URL: http://www.jadaktech.com/products/product.cfm?prod=973, 3 pages, Mar. 6, 2008.

JADAK Technologies, D9500 Series HomeBase, Product detail sheet, URL: http://www.jadatech.com/products/product.cfm?prod=1055, 1 page, Mar. 6, 2008.

JADAK Technologies, Dolphin 73-74x0 Intellibase, product detail sheet, URL: http://www.jadaktech.com/products/product.cfm?prod=835, 1 page, Mar. 6, 2008.

JADAK Technologies, Dolphin 73-74x0 Mobile Base, product detail sheet, URL: http://www.jadaktech.com/products/product.cfm?prod=834, 1 page, Mar. 6, 2008.

JADAK Technologies, Dolphin 73-74x0 Net Base, product detail sheet, URL: http://www.jadaktech.com/products/product.cfm?prod=904, 1 page, Mar. 6, 2008.

JADAK Technologies, Dolphin 7900 HomeBase, product detail sheet, URL: http://www.jadaktech.com/products/product.cfm?prod=1049, 1 page, Mar. 6, 2008.

JADAK Technologies, Dolphin 7900 Mobile Computer, product detail sheets, URL: http://www.jadaktech.com/products/product.cfm?prod=995, 6 pages, Nov. 29, 2006.

JADAK Technologies, ITScriptNet Data Collection Software, product detail sheets, URL: http://www.jadaktech.com/products/product.cfm?prod=891, 2 pages, Mar. 6, 2008.

MRA Technologies, Mobile Inventory Management from MRA Technologies, URL: http://mra-tech.com/mobile.html, 2 pages, Apr. 18, 2007.

Jul. 19, 2012 European Search Report in European Application No. 08162401.7.

* cited by examiner

DATA COLLECTION SYSTEM HAVING EIR TERMINAL INTERFACE NODE

CROSS-REFERENCE TO RELATED APPLICATIONS

This application is a divisional of U.S. patent application Ser. No. 12/979,147, filed Dec. 27, 2010, entitled "Data Collection System Having EIR Terminal," which is a divisional of U.S. patent application Ser. No. 11/893,603, filed Aug. 17, 2007, (now U.S. Pat. No. 7,857,222). All of the above applications are expressly incorporated herein by reference.

FIELD OF THE INVENTION

This invention relates generally to providing a network accessible node interfacing with a fleet of terminals, and in particular to providing a network accessible interface node that facilitates management of a fleet of portable encoded information reading terminals (EIR terminals), by directing performance of software upgrades and/or configuration update actions by one or more members of the fleet of EIR terminals.

BACKGROUND OF THE INVENTION

Various organizations, including retail and manufacturing businesses, can employ sizable fleets of EIR terminals. These terminals include, for example, barcode reading terminals and other types of EIR terminals. These terminals are typically mobile, but are periodically engaged with a docking station (e.g., for charging the battery at the end of every working shift). A number of actions typically need to be performed upon the terminals as part of the terminal fleet management operations, including terminal reprogramming operations (e.g., terminal software upgrade or terminal configuration update). Communicating and interfacing with a large fleet of mobile terminals can require substantial planning and effort.

BRIEF DESCRIPTION OF THE DRAWINGS

The objects and features of the invention can be better understood with reference to the claims and drawings described below. The drawings are not necessarily to scale, the emphasis is instead generally being placed upon illustrating the principles of the invention. Within the drawings, like reference numbers are used to indicate like parts throughout the various views.

DETAILED DESCRIPTION OF THE INVENTION

Figure 1A:
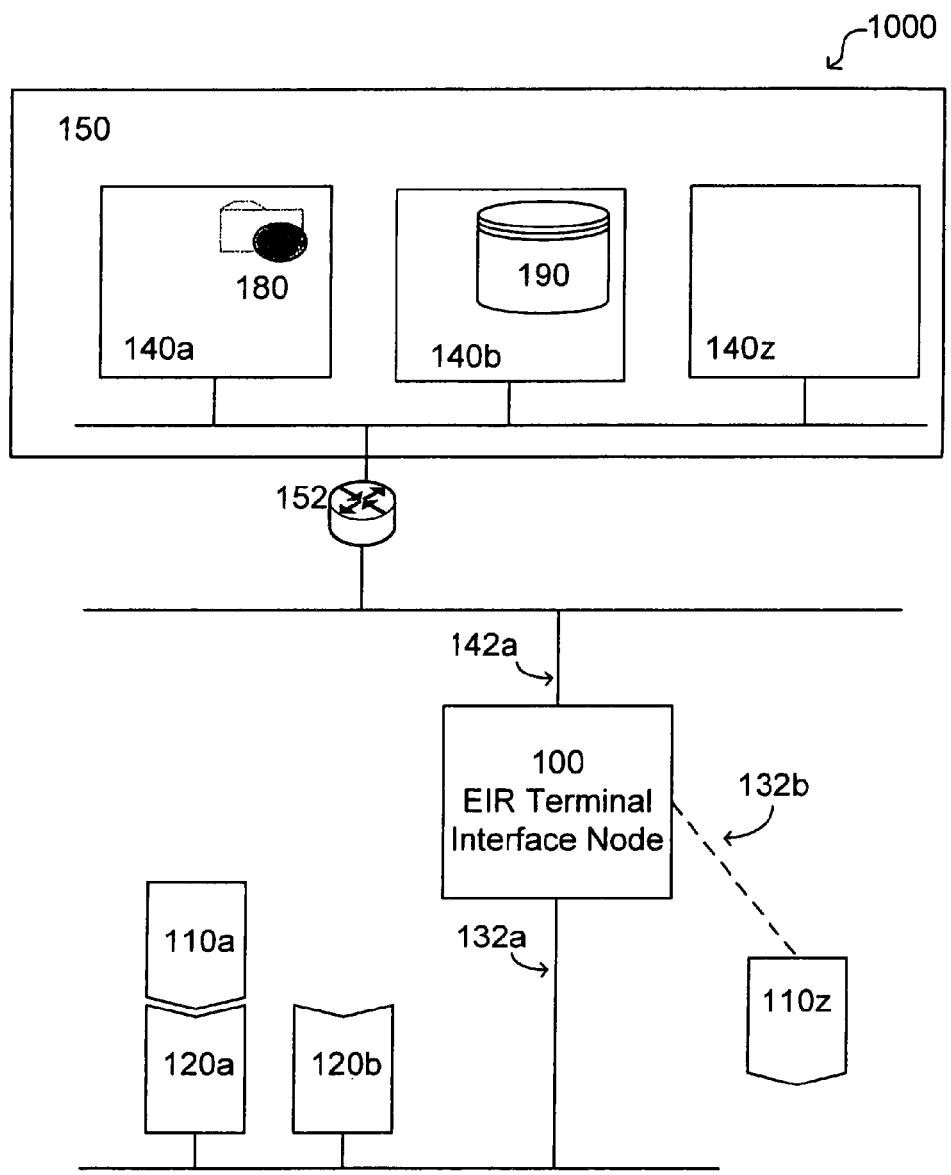
FIG. 1a illustrates a communications network including an EIR terminal interface node, a plurality of EIR terminals, and a resource network.

There is described herein a data collection system having one or more encoded information reading (EIR) terminals and an EIR terminal interface node (interface node) in conjunction with the one or more EIR terminals. The interface node can be configured for use in managing the reprogramming of the one or more EIR terminals. In one embodiment, the interface node can be disposed in a common local facility and connected to a common local area network with the at least one EIR terminal. In one embodiment, the interface node can retain status information respecting EIR terminals of the system. In another embodiment, the interface node can be configured to receive and process status messages from EIR terminals updating the status information of each EIR terminal in the system. The interface node can update a terminal status database in communication with the interface node utilizing terminal status data contained in a terminal status message received from an EIR terminal.

The terminal status database can facilitate resolving terminal identifying conditions based upon the presence and/or status of specific hardware and/or software components, thus allowing for flexible descriptions of subsets of terminals to be reprogrammed. For example, all terminals having a specific hardware component might need to perform an upgrade of the software associated with the hardware component, or all terminals having a particular software component of a particular version number might need to perform an upgrade of the software component, etc.

In another embodiment, the interface node can receive and process reprogramming request messages from EIR terminals of the system. In one embodiment, a reprogramming request message can be provided by a status message. Responsively to processing a reprogramming request message, an interface node can build a reprogramming message for transmittal to the requesting EIR terminal. An interface node, in one embodiment can be configured so that the interface node in building reprogramming messages utilizes the information determined by querying the terminal status database. In another aspect, an interface node can build a reprogramming message for transmittal to one or more EIR terminals responsively to receiving user interface input. In another aspect, an interface node can build a reprogramming message for transmittal to one or more EIR terminals responsively to communications received from a remotely located resource network.

In addition to being in communication with a terminal status database, an interface node can be in communication with a terminal reprogramming database. The terminal reprogramming database can be provided at a location external to any EIR terminal. An interface node can utilize the information determined by querying the terminal reprogramming database in building reprogramming messages for transmittal to EIR terminals. An interface node can also be in communication with a file system that stores files for transmittal to EIR terminals. The terminal reprogramming database can contain a plurality of reprogramming records, each reprogramming record containing an EIR terminal identifying information and at least one of: a binary file, a data file, a script file, for use by the interface node in determining whether one or more identified files will be transmitted to a certain EIR terminal of the system. The terminal identifying information can be specified, e.g., by a terminal unique identifier, or by one or more <operand=value> conditions, wherein the operand can be, for example, terminal ID, terminal type, component type, component status, etc.

In one embodiment, the interface node can be in communication with a resource network, which in one embodiment can comprise one or more computers disposed at a location remote from the interface node. A "computer" herein shall refer to a programmable device for data processing, including a central processing unit (CPU), a memory, and at least one communication interface. A computer can be provided, e.g., by a personal computer (PC) running Linux operating system.

In one embodiment, the interface node can have a user interface allowing its operator to specify a Domain Name System (DNS) name or IP address of at least one computer on the resource network.

In one embodiment, the interface node can be configured to receive reprogramming information messages responsively to transmitting a request to a computer on the resource network. In one embodiment, a response to a reprogramming message request can include a redirection address. The interface node can be configured to receive reprogramming information messages responsively to transmitting a request to the redirection address.

In one embodiment, the interface node can communicate with the resource network using the Service Oriented Architecture Protocol (SOAP), Open Database Connectivity (ODBC) protocol, and/or a proprietary application level protocol.

In one embodiment, the resource network can initiate the communication with the interface node by transmitting a reprogramming information message to the interface node.

The interface node can be configured to receive and process reprogramming information messages from the resource network. The reprogramming information messages can take the form of reprogramming file identifier messages and reprogramming file messages. At least one computer on the resource network can have a user interface enabling an operator to cause the interface node to direct performance of reprogramming actions, e.g., by initiating transmittal of reprogramming information messages to an interface node, which can utilize information of a reprogramming information message to modify the reprogramming database. In one embodiment, the resource network can have an interface to one or more external systems (e.g., to an EIR terminal manufacturer's software version control system). The messages received by the resource network from the external systems can cause the interface node to direct performance of reprogramming actions, e.g., by initiating transmittal of reprogramming information messages by the resource network to an interface node.

In one embodiment, the interface node can be configured to allow a local administrator to specify a processing workflow to be executed upon a reprogramming message received from a resource network before performing a modification of the reprogramming database, e.g., in accordance with local business rules and procedures. For example, local business rules and procedures may require a quality control to be performed upon a software update received from the resource network before authorizing the modification of the terminal reprogramming database.

In another embodiment, the interface node can be configured so that the interface node when processing a reprogramming file message caches the received reprogramming file message for later use by EIR terminals of the system. The interface node can also be configured so that the interface node when receiving a reprogramming file identifier, messages the interface node, determines whether the reprogramming file corresponding to the identifier has been previously cached, and responsively transmits a file request message to the host processor if the file has not been previously cached. Caching of files at the interface node reduces the volume of traffic between a host processor and the interface node. The reduction in the traffic can be dramatic for data collection sites employing sizeable fleets, where it might be necessary to distribute the same file to a large number of terminals. In the absence of the caching feature by the interface node, the file would be transmitted, possibly from a remote location over a wide area network, to every terminal.

In one embodiment, the terminal reprogramming database can be modified by way of commands input by a user using a user interface of the interface node or by way of processing the mentioned reprogramming information messages received from a host processor.

In one embodiment, the interface node can be configured to transmit a reprogramming message to an EIR terminal responsively to an EIR terminal being physically docked in a docking station and can be further configured to be restricted from transmitting reprogramming messages to an EIR terminal unless the EIR terminal is physically docked to a docking station. The interface node can be further configured to transmit a reprogramming message to an EIR terminal only during a specified time frame, e.g., from 2 a.m. until 4 a.m. In such manner, an operator of an EIR terminal is protected from interruptions in the operation of an EIR terminal which otherwise might be brought about by the receipt of reprogramming messages.

Transmitting reprogramming messages responsively to a docking event has a further advantage of facilitating the scheduling of reprogramming messages transmittal to terminals, since all terminals are periodically docked to a docking station (e.g., for charging the battery at the end of every working shift). Thus, an operator or an automated procedure initiating a terminal reprogramming operation might be virtually certain that the reprogramming message would be transmitted to the terminal within a known period of time (e.g., at the end of the current work shift).

The system can further be configured so that an interface node receives a status update message from an EIR terminal responsively to an EIR terminal being physically docked in a docking station and can be further configured so that an interface node can be restricted from receiving status update messages unless the terminal is physically docked to a docking station.

An interface node can facilitate the management of a fleet of EIR terminals which includes tracking terminal status, responding to requests for reprogramming by transmitting terminal reprogramming messages, and performing terminal diagnostics. The EIR terminal interface node can be configured to communicate with a resource network and a fleet of EIR terminals. An EIR terminal can connect to an interface node either directly (e.g., over a wireless network interface) or via a docking station. The resource network can be configured to communicate with n>=1 interface nodes located at $0 \leq m \leq = n$ local facilities, over a local area network (LAN) or a wide area network (WAN).

In one embodiment, an EIR terminal can be configured to communicate with an interface node via TCP/IP protocol. In one aspect, an EIR terminal can be configured to use a static IP address. In another aspect, an EIR terminal can be configured to request a dynamic IP address by broadcasting a Dynamic Host Configuration Protocol (DHCP) request. In another embodiment, an EIR terminal can be configured to communicate with an interface node via Point-to-Point Protocol (PPP).

An interface node can be configured to run a DHCP server software program to service DHCP requests initiated by EIR terminals for dynamic assignment of IP addresses.

An EIR terminal can be configured, upon successfully engaging with a docking station, to upload the data which needs to be stored externally (e.g., the data collected by the terminal during the last work shift), and to transmit a terminal status message reflecting the originating terminal software and hardware status, and/or status of at least some of the terminal's hardware components.

In one embodiment, an interface node can be configured to query a docked EIR terminal for the list of active communication interfaces. An EIR terminal can be configured to reply to the active interface list request with the list of its active interfaces. In one embodiment, the list of active interfaces can include their types and IP addresses. An interface node can be configured, upon receiving the list of a terminal's active interfaces, to select an interface not associated with the docking station to which the terminal is currently engaged, and to perform further communications with the terminal over the selected interface.

An interface node can be configured to perform EIR terminal management functions including: receiving, storing locally and/or forwarding to a host computer the data collected by the EIR terminal members of the managed fleet, transmitting to EIR terminals messages directing terminal reprogramming operations, including software upgrades (e.g., binary files for execution) and configuration updates (e.g., data files); caching reprogramming files received from the resource network. An interface node can be further configured to allow any higher priority operations (e.g., data upload by an EIR terminal) to complete before performing terminal reprogramming operations. An EIR terminal interface node can be further configured, upon completing any higher priority operations, to perform terminal diagnostics and/or testing.

An interface node can receive a reprogramming file message from a resource network at a time asynchronous relative to the time at which it transmits reprogramming files to an EIR terminal. Providing a data collection system in which reprogramming data is asynchronously transmitted to an EIR terminal provides a number of advantages. For example, an interface node can include a reprogramming file information viewer and a user can review reprogramming information prior to transmission of a reprogramming file to an EIR terminal and possibly manually modify characteristics of a reprogramming file prior to transmission of a reprogramming file. Also, when reprogramming files such as binary files and data files are stored in a file system in communication with an interface node, security checks can be run on the files prior to transmission to an EIR terminal to check for viruses, security breaches, and the like. Also, asynchronously transmitting reprogramming data from a host processor to an EIR terminal when combined with a caching of reprogramming files at an interface node reduces a volume of data traffic between a host processor and an interface node.

While systems, methods, and apparatuses described herein are useful when incorporated in a data collection system incorporating encoded information reading terminals, it will be understood that systems, methods, and apparatuses described herein can also be usefully incorporated in communications networks other than data collection systems that are devoid of EIR terminals.

FIG. 1a illustrates an embodiment of data collection system 1000 including an interface node 100. In one embodiment, the interface node 100 can be implemented as a computer comprising a CPU (not shown in FIG. 1a), a memory (not shown in FIG. 1a), and a plurality of network interfaces 132a-132z, 142a-142z for communicating with the EIR terminals 110a-110z, and a resource network 150. In another embodiment (not shown in FIG. 1a), the interface node 100 can be implemented as two or more computers, each of the computers comprising a CPU, a memory, and at least one communication interface.

Referring again to FIG. 1a, the resource network 150 can be in communication with interface node 100 over a router 152. The resource network 150 can comprise one or more computers 140a-140z. One or more computers on the resource network 150 can run an HTTP server software component 180. The resource network 150 can include a fleet management database 190 which can be a central repository of the information regarding configuration and status of EIR terminals located at several local sites, and run on one or more computers 140a-140z. In one embodiment, the HTTP server software component 180 and the fleet management database 190 can reside on one or more computers 140a-140z. In another embodiment, the functionality of the resource network can be provided by a single computer 140.

Figure 1B:
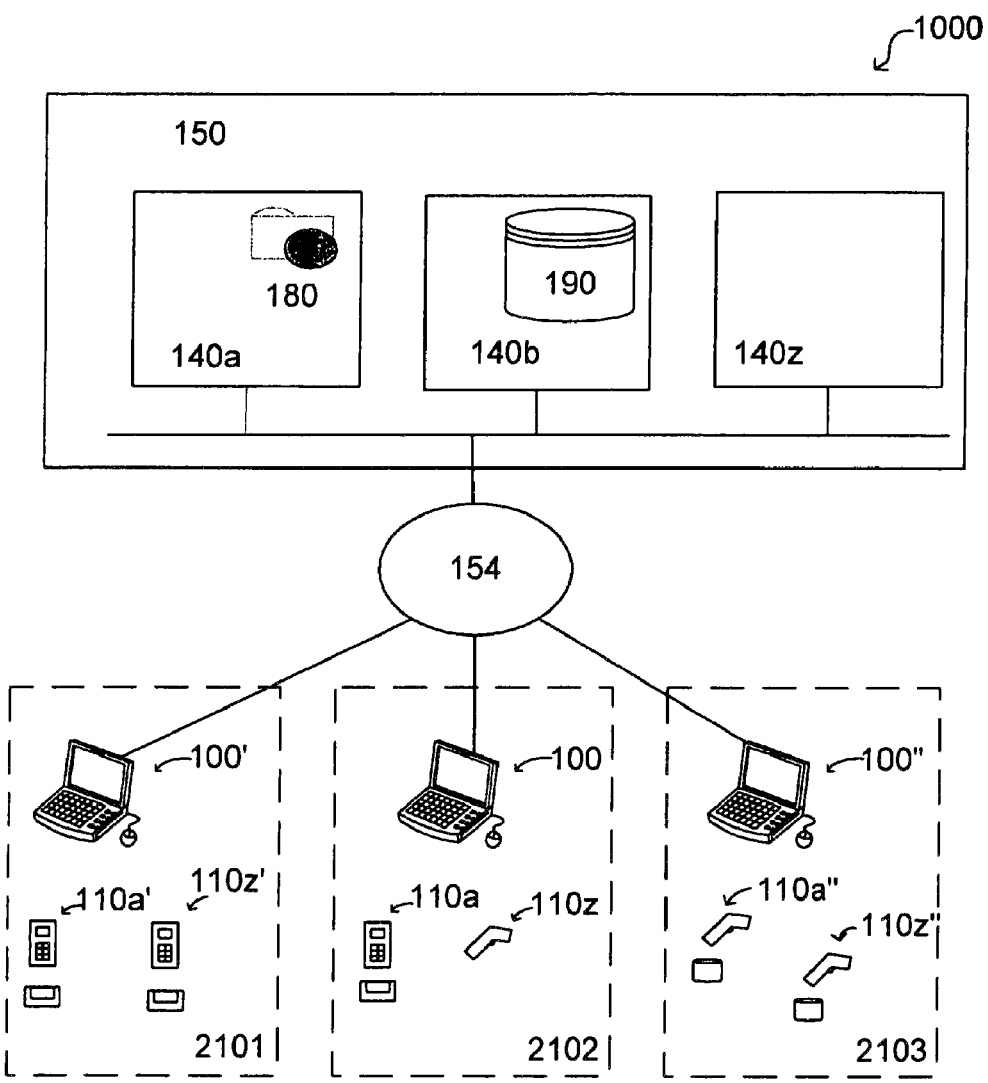
FIG. 1b illustrates a diagram of a data collection system comprising several interface nodes disposed at several data collection facilities.

In one embodiment, as shown in FIG. 1b interface node 100 can be disposed at a common local facility 2102 with the fleet of EIR terminals 110a-110z and can be in communication with the fleet of EIR terminals over a LAN. A local facility at which interface node 100 and EIR terminals 110a-110z can be disposed, can be e.g., a data collection facility such as retail store, a distribution center, a warehouse, a transportation center (e.g., an airport), or a medical care facility. Resource network 150 in one embodiment can be disposed remotely relative to local facility 2102 and can be in communication with interface node 100 over a WAN 154. System 1000 as is indicated in FIG. 1b can include additional interface nodes 100' and 100" each disposed at respective additional data collection facilities 2101 and 2103. Each interface node 100, 100', 100" can be in communication with a different fleet of EIR terminals 110a-100z. Interface node 100 can be in communication with fleet of EIR terminals 100a-100z, interface node 100' can be in communication with fleet of EIR terminals 110a'-110z', and interface node 100" can be in communication with fleet of EIR terminals 110a"-110z".

Figure 1C:
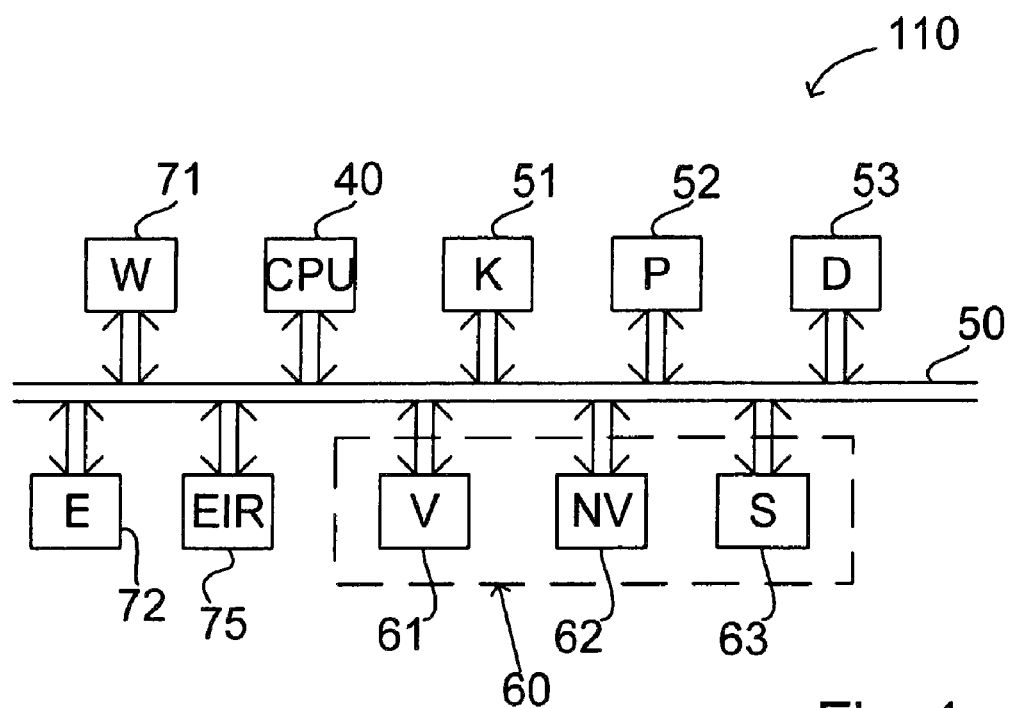
FIG. 1c illustrates a block diagram of a generic encoded information reading terminal.

A block diagram of a generic encoded information reading terminal 110 is shown in FIG. 1c. Encoded information reading terminals 110a-110z, 110a'-110z', 110a"-110z" can be provisioned in the manner of terminal 110 shown in FIG. 1c.

Each encoded information reading terminal 110 can include a central processing unit (CPU) 40 in communication with various input devices such as a keyboard 51, pointer controller 52, and output devices such as a display 53. Such input and output devices can be in communication with CPU 40 via a system bus 50. Also in communication with CPU 40 via system bus 50 can be a memory 60. Memory 60 can comprise a combination of one or more volatile memory devices 61, one or more non-volatile memory devices 62, and one or more long term storage devices 63. Further in communication with CPU 40 can be an encoded information reading device 75. For communication with interface node 100 and other external computers, EIR terminal 110 can include a plurality of communication interfaces 71, 72. For example, in one embodiment EIR terminal can have an Ethernet communication interface 72 and an 802.11 wireless communication interface 71.

In one example, encoded information reading device 75 can be a barcode reading device, such as the IT4XXX/5XXX imaging module that has a decode out circuit of the type available from Hand Held Products, Inc. (Skaneateles Falls, N.Y.). The IT4XXX/5XXX imaging module with a decode out circuit provides decoding of a plurality of different types of barcode symbols and other decodable symbols such as PDF 417, Micro PDF 417, Maxicode, Data Matrix, QR Code, Aztec, Aztec Mesa, Code 49, UCC Composite, Snowflake, Data Gliffs, Code 39, Code 128, Codabar, UPC, EAN, Interleave 205, RSS, Code 93, Codablock, BC412, Postnet, Planet Code, BPO Forcedate, Canadian Forcedate, Japanese Post, KIX (Dutch Post), OCR A, OCR B, and any combinations thereof. In another example, reading device 75 can be an RFID reading device, such as the Skytek Sky Module M1 reading device and Sky Module M8 reading device. In the case of a barcode reading device, reading device 75 can scan the contents of, for example, a barcode. In another example, reading device 75 can be a card reading device such as the Panasonic ZU-9A36CF4 integrated circuit smart card (IC CARD) reading device. In yet another example, encoded information reading device 75 can be any combination of barcode reading device, RFID reading device, and card reading device. Each EIR terminal of system 1000 can be incorporated in a hand held housing, examples of which are shown in FIG. 1c.

Figure 1D:
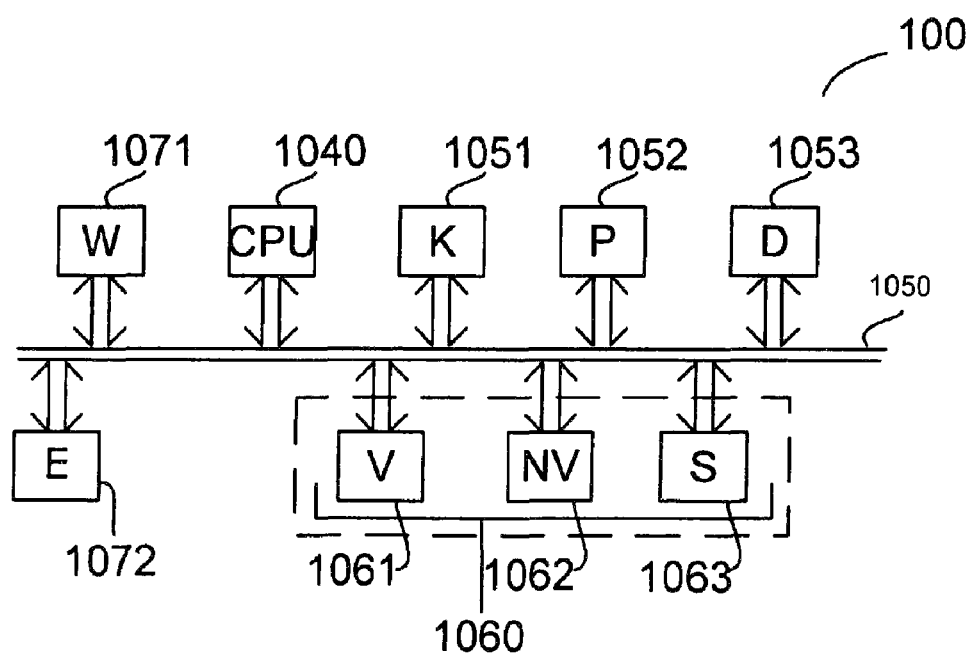
FIG. 1d illustrates a block diagram of an exemplary embodiment of an interface node 100 of FIG. 1.

Block diagrams illustrating exemplary embodiments of interface node 100 and a resource network computer 140 are described in FIG. 1d. In one embodiment, interface node 100 can be implemented as a computer that can include a memory 1060 having a combination of one or more volatile memory devices 1061, non-volatile memory devices 1062, and long term memory storage devices 1063, and a CPU 1040 in communication with memory 1060 via a system bus 1050. Interface node 100 can have a plurality of communication interfaces 1071, 1072 for communication with each of several docking stations 120a-120z, including, e.g., an Ethernet 1072 and an 802.11 wireless communication interface 1071. Alternatively, the interface node 100 can have a single communication interface coupled to a multiplexer (not shown) for communicating with each of several docking stations 120a-120z. Interface node 100 can have additional communication interfaces for communicating to external computers such as computers on the resource network 150 and/or EIR terminals 110 directly (i.e., not through docking station 120a-120z). Interface node 100 can also include a user interface component such as a display 1053, a pointer controller 1052, and a keyboard 1051. Interface node 100 can be adapted to run a graphical user interface wherein a user can select various displayed buttons on display 1053 using pointer controller 1052.

In another embodiment (not shown in FIG. 1d), interface node 100 can be implemented as two or more computers, where each of the computers can include a CPU, a memory, a system bus, one or more communication interfaces, a display, a pointer controller, and a keyboard.

Figure 5A:
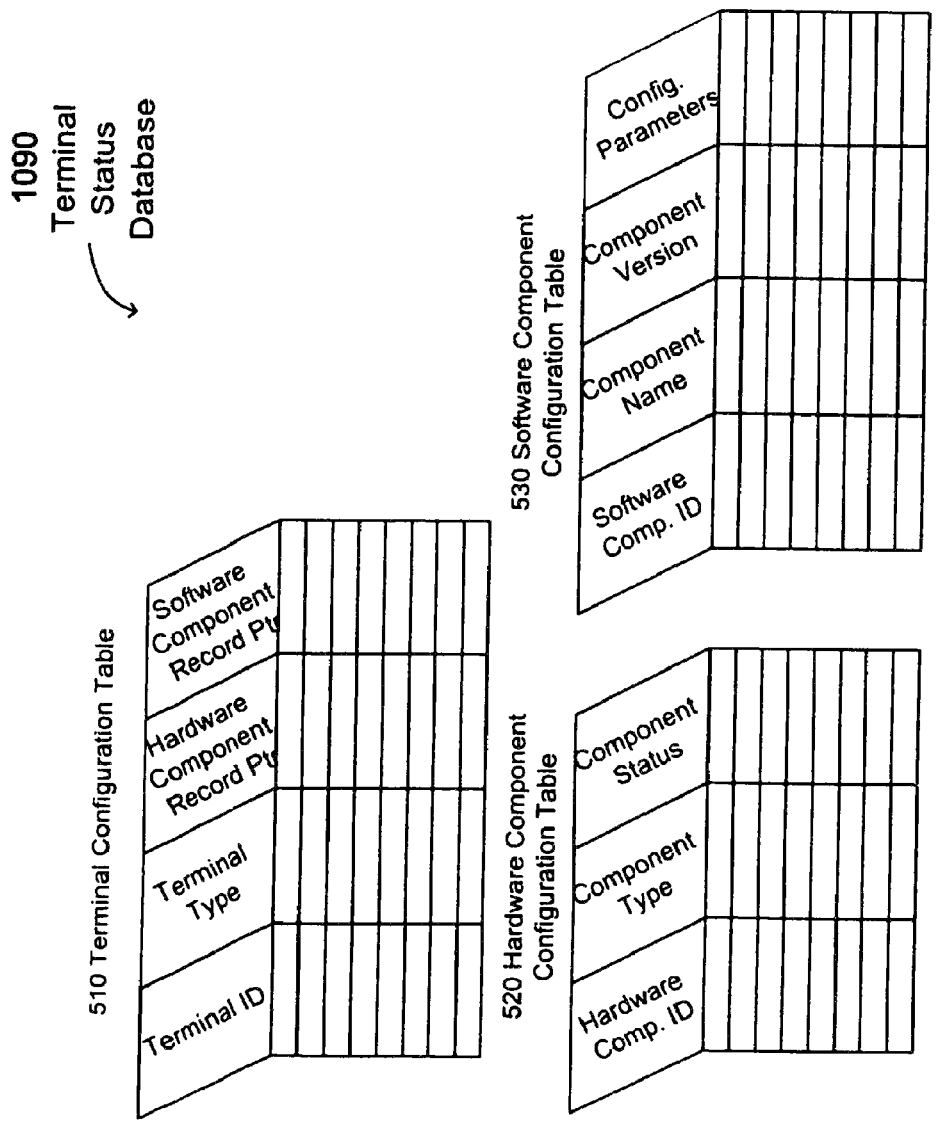
FIG. 5a illustrates an example of the structure of the tables of an EIR terminal Fleet Management Database.

Referring to further aspects of interface node 100, interface node 100 can also include a file system 2080, and can incorporate a number of databases including an EIR Terminal Status Database 1090 and Terminal Reprogramming Database 1094. An exemplary embodiment of the EIR terminal status database 1090 is shown in FIG. 5a, where database 1090 is shown as including three tables; namely a Terminal Configuration Table 510, a Hardware Component Status Table 520, and a Software Component Status Table 530.

Figure 5B:
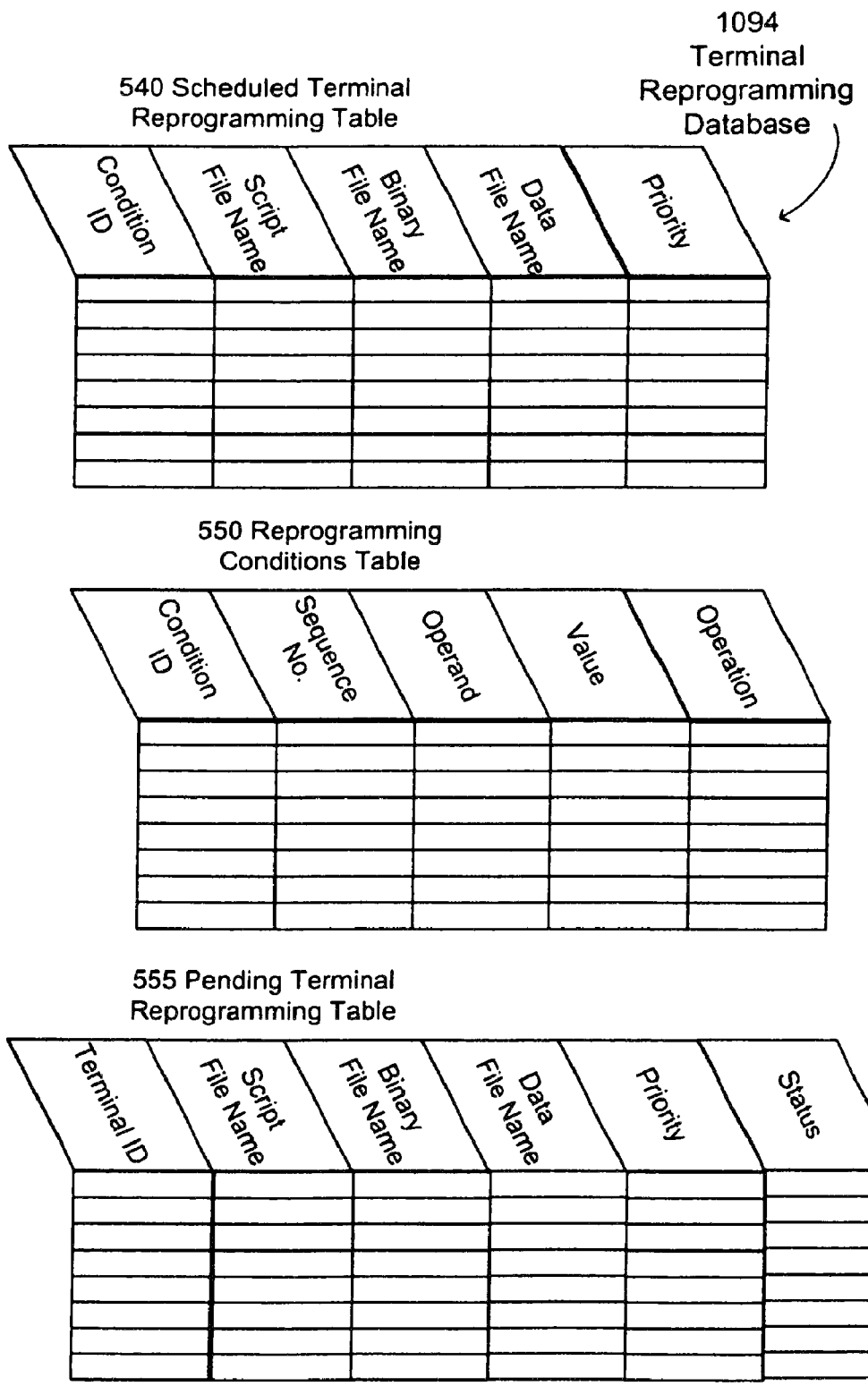
FIG. 5b illustrates an example of the structure of the tables of an EIR terminal Fleet Management Database.

A Terminal Reprogramming Database 1094, an example of which is shown in FIG. 5b, can comprise a Scheduled Terminal Reprogramming Table 540, a Reprogramming Conditions Table 550, and a Pending Terminal Reprogramming Table 555. Regarding database 1094, reprogramming database can contain reprogramming records, each reprogramming record containing terminal identifying information and reprogramming file identifiers (which may be stored in various columns such as Script File Name, Binary File Name and Data File Name columns), for use by interface node 100 in determining whether a reprogramming message is to be built for a particular EIR terminal. The terminal identifying information can be specified, e.g., by one or more <operand=value> conditions, wherein the operand can be, for example, terminal ID, terminal type, component type, component status, etc. If more than one <operand=value> condition is used to specify the terminal identifying information, then the sequential number of the condition can be stored in the sequence number column, and the conditions can be joined by AND or OR logical operations specified in the operation column, e.g., <component type=battery> AND <component status=1>.

In another aspect, a software process running on interface node 100 can query the tables of database 1094 for purposes of determining whether an identified file is to be transmitted to a particular terminal. System 1000 can be configured so that for every record in Scheduled Terminal Reprogramming Table 540, one or more conditions can be extracted from Reprogramming Conditions Table 550, with condition ID in the records extracted from Reprogramming Conditions Table 550 matching the condition ID in the record of Scheduled Terminal Reprogramming Table 540. If more than one condition is extracted from Reprogramming Conditions Table 550, the extracted conditions can be ordered according to the value of the sequence number column of Reprogramming Conditions Table 550, and joined together with the logical operations specified in the operation column of Reprogramming Conditions Table 550. System 1000 can be further configured so that for every terminal satisfying the one or more conditions extracted, a new record can be created in Pending Terminal Reprogramming Table 555. The newly created record can include a Terminal Identifier, Script File Identifier; Binary File Identifier, Data File Identifier, the Reprogramming Operation Priority, and the Reprogramming Operation Status.

The Reprogramming Operation Priority can be specified, e.g., on a 1 to 10 scale with 1 being the highest and 10 being the lowest priority.

The Reprogramming Operations Status can be set to "Scheduled" upon creating a new record. The Reprogramming Operation Status can then be changed to "Pending"

upon transmitting a reprogramming message to the corresponding terminal. The Reprogramming Operation Status can be finally set to "Complete" upon receiving a terminal status message confirming the completion of the reprogramming operation.

For every record in table 555 with status different from "Complete", interface node 100 can build a reprogramming message to a particular terminal identified by the Terminal ID.

Figure 1E:
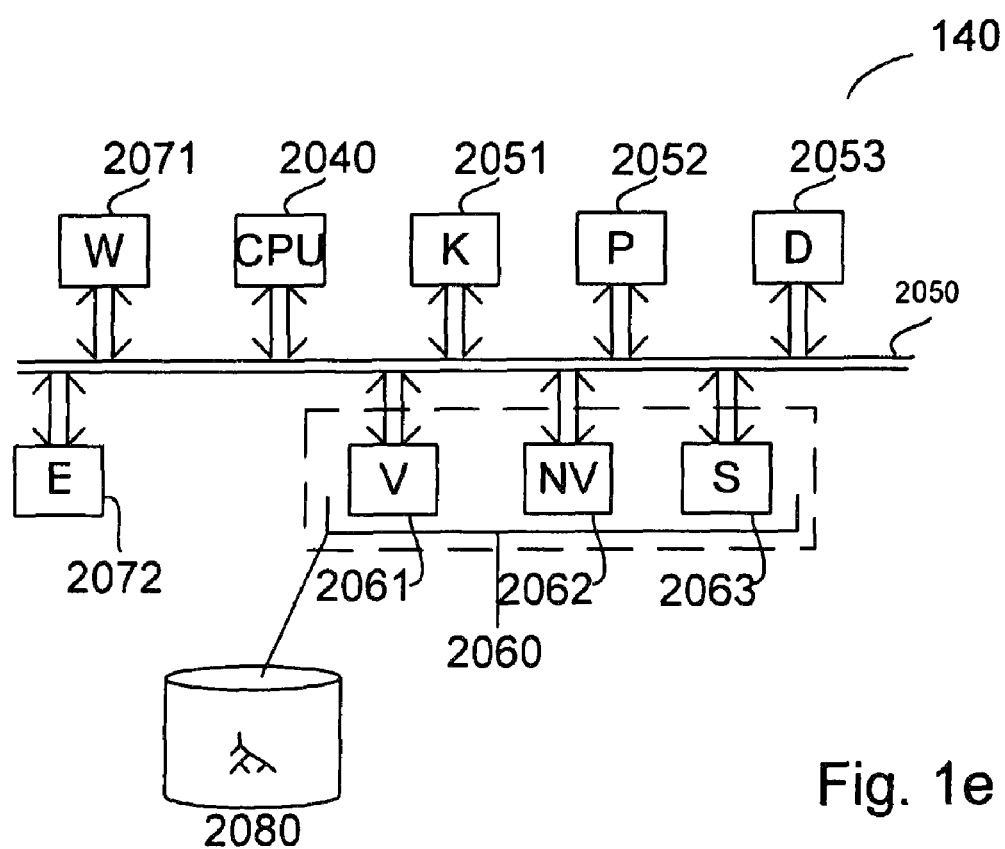
FIG. 1e illustrates a block diagram of an exemplary embodiment of a resource network computer 140 of FIG. 1.

Referring to resource network computer 140, resource network computer 140 can be provisioned in a manner similar to interface node 100. Referring to FIG. 1e, resource network computer 140 can include a CPU 2040 and a memory 2060 having a combination of one or more volatile memory devices 2061, non-volatile memory devices 2062, and long term memory storage devices 2063 in communication with CPU 2040 by way of system bus 2050. Memory 2060 can have a combination of one or more volatile non-volatile and store devices. Resource network computer 140 can have one or more communication interfaces 2071, 2072 for communication with each of second external computers. Resource network computer 140 can also include user interface components such as a display 2053, a pointer controller 2052, and a keyboard 2051. Resource network computer 140 can be adapted to run a graphical user interface wherein a user can select various displayed buttons on display 2053 using pointer controller 2052. Resource network computer 140 can also include a file system 2080.

In the embodiment shown, an EIR terminal 110a-110z can communicate with the EIR terminal interface node 100 either directly (e.g., via a wireless interface) or via a docking station 120a-120z to which the EIR terminal is currently engaged (physically docked). An EIR terminal 110a-110z can have a wireline (e.g., Ethernet, RS/232, etc.) or wireless (e.g., Bluetooth, IEEE 802.11x, infrared, etc.) connection to docking stations 120a-120z. A docking station can be a "dumb" docking station which is not capable of any processing of the contents of the messages it relays to and from the EIR terminal it is engaged to. A "dumb" docking station can include a microcontroller programmed to format data packets in accordance with a known protocol, e.g., RS232, ETHERNET. The functions of a "dumb" docking station can include charging of the EIR terminal's battery (not shown) and relaying data packets between the EIR terminal 110 and EIR terminal interface node 100. A "dumb" docking station can be characterized by a relatively low cost.

EIR terminal interface node 100 can be configured to perform EIR terminal management functions including: receiving storing locally and forwarding to a host computer the data collected by the EIR terminal members of the managed fleet, conditionally transmitting messages directing terminal reprogramming including software upgrades (e.g., executable files) and configuration updates (e.g., data files) to EIR terminals responsive to receiving an EIR terminal reprogramming request message, receiving updates from the resource network, caching update files received from the resource network, and maintaining a local copy of terminals status database.

Figure 2A:
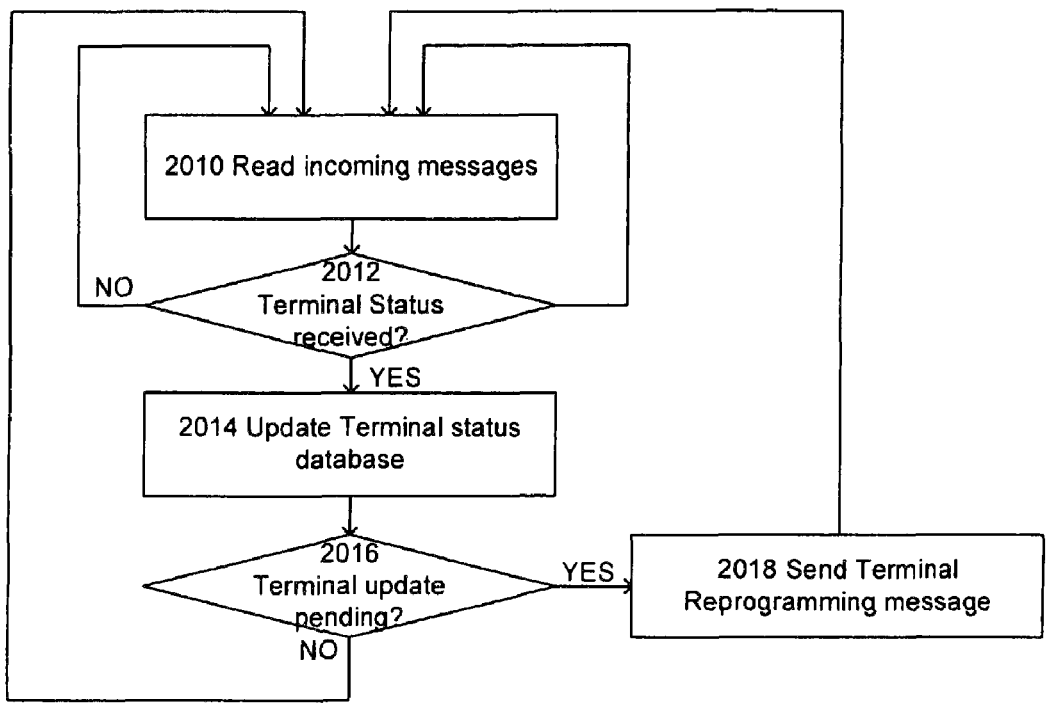
FIG. 2a illustrates a flow diagram of a sample implementation of the execution thread responsible for processing the messages received by EIR terminal interface node from the EIR terminal members of the managed fleet.
Figure 2B:
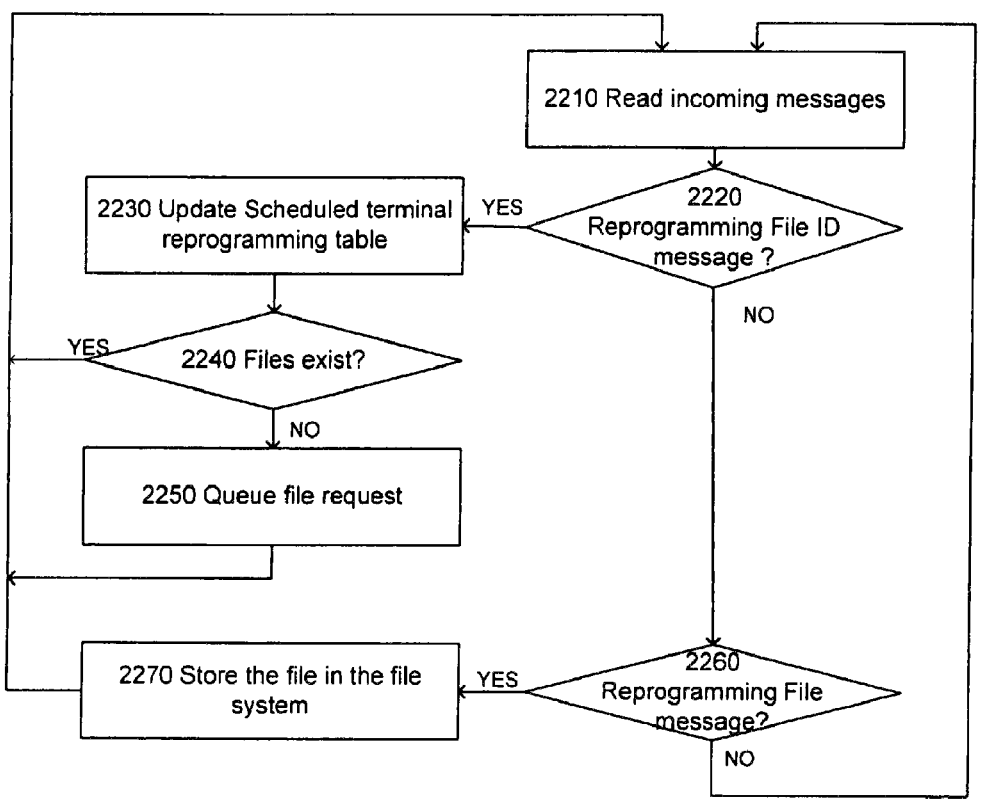
FIG. 2b illustrates a flow diagram of a sample implementation of the execution thread responsible for processing the messages received by EIR terminal interface node from the resource network.

FIGS. 2a and 2b illustrate a flow diagram of operation of an EIR terminal interface node in an exemplary embodiment managing a fleet of EIR terminals.

Several important functions of the EIR terminal fleet management can be implemented as independently and simultaneously executable processing threads. However, a skilled artisan would appreciate the fact that other suitable implementations are possible, e.g., employing multiple processes rather than multiple threads in an operating system which does not support threads, or employing a single process architecture with or without using hardware and/or software interrupt servicing routines in an operating system which only provides for single process architecture, etc.

Each of FIGS. 2a-2b illustrates a flow diagram of an algorithm implementing one of the processing threads executable by EIR terminal interface node. One execution thread is responsible for processing the messages received by EIR terminal interface node from the EIR terminal members of the managed fleet. Another execution thread is responsible for processing the messages received by EIR terminal interface node from the resource network.

A skilled artisan would appreciate the fact that other processing threads performing auxiliary functions (e.g., processing user interface actions, managing the interface node outbound messages queue, etc.) may be necessary to fully implement the functionality of EIR terminal interface node.

FIG. 2a illustrates a flow diagram of a sample implementation of the execution thread responsible for processing the messages received by interface node from the EIR terminal members of the managed fleet. A new execution thread implementing the described algorithm can be initiated for every connection by an EIR terminal 110a-110z of FIG. 1a upon the EIR terminal's successful engagement with (i.e., physical docking in) a docking station 120a-120z of FIG. 1a and establishing a connection to EIR terminal interface node. In the embodiment described with reference to the formal drawings of FIG. 2a, a status message serves as a reprogramming request and interface node 100 can respond to the status message by building a reprogramming message for transmittal to the requesting EIR terminal 110. Alternatively, system 1000 can be adapted so that interface node 100 can build and transmit reprogramming messages to EIR terminals 110 responsively to user interface actions and/or to messages received from one or more external systems.

Upon being engaged with a docking station, an EIR terminal can transmit a terminal status message 2001 to EIR terminal interface node 100 of FIG. 1a. The message can include the following information:

1. EIR terminal ID, e.g., manufacturer's serial number.
2. EIR terminal type, e.g., manufacturer's model.
3. Hardware configuration, represented by a list of at least some of the hardware components contained by the EIR Terminal (e.g., a barcode reading terminal can contain an imager, a battery, etc.) For some of the hardware components, additional information can be included, such as the component manufacturer's serial number, and status information (e.g., battery charge level, imager status, etc.)
4. Software configuration, represented by a list of at least some of the software components installed at the EIR Terminal. For each software component, at least its name and version can be provided. For some of the software components, additional information can be included such as a list of the values of the component's configuration parameters.

At step 2010, EIR terminal interface node can read a message from one of EIR terminals 110a-110z of FIG. 1a received via the communication interfaces 132a-132z of FIG. 1a. Only two interfaces 132a and 132b are shown.

At step 2012, EIR terminal interface node 100 can ascertain whether a terminal status message has been received. If yes, the processing continues at step 2014; otherwise, the method loops back to step 2010.

At step 2014, EIR terminal interface node 100 can update a local copy of a terminal status table with the EIR terminal status information, and can queue a terminal status message for transmittal to the resource network 150 of FIG. 1a. Upon receiving the terminal status message, the resource network 150 can update the EIR terminal configuration record in the fleet management database 190 of FIG. 1a.

Turning ahead to FIG. 5a, a terminal status database 1090 can include a plurality of tables that can be implemented utilizing relational database technologies. For example, terminal status database 1090 as indicated in FIG. 5a can include a Terminal Configuration Table 510, a Hardware Component Configuration Table 520, and a Software Component Configuration Table 530.

At step 2016, EIR terminal interface node 100 can utilize the information determined by querying the Terminal Reprogramming Database 1094 to determine whether a docked EIR terminal should be reprogrammed responsively to its docking in a docking station. With further reference to FIG. 5b, a Terminal Reprogramming Database 1094 can take the form shown in FIG. 5b. Database 1094 can comprise a Scheduled Terminal Reprogramming Table 540 having such columns as Condition ID, Script File Name, Binary File Name, Data File Name, and Priority.

The Condition ID field can refer to terminal identifying condition which can be stored in Reprogramming Conditions Table 550. A terminal identifying condition can be specified, e.g., by one or more <operand=value> statements, wherein the operand can be, for example, terminal ID, terminal type, component type, component status, etc. If more than one <operand=value> condition is used to specify the terminal identifying information, then the sequential number of the condition can be stored in the sequence number column, and the conditions can be joined by AND or OR logical operations specified in the operation column, e.g., <component type=battery> AND <component status=1>.

A software process running on interface node 100 can query the tables of database 1094 for purposes of determining whether an identified file is to be transmitted to a particular terminal. System 1000 can be configured so that for every record in Scheduled Terminal Reprogramming Table 540, one or more conditions can be extracted from Reprogramming Conditions Table 550, with Condition ID in the records extracted from Table 550 matching the Condition ID in the record of Table 540. If more than one condition is extracted from Table 550, the extracted conditions can be ordered according to the value of the Sequence Number column of Table 550, and joined together with the logical operations specified in the Operation column of Table 550. System 1000 can be further configured so that for every terminal satisfying the one or more conditions extracted, a new record can be created in Pending Terminal Reprogramming Table 555. The newly created record can include a Terminal ID; Script File Name; Binary File Name; Data File Name; the Reprogramming Operation Priority; and the Reprogramming Operation Status.

The Reprogramming Operation Priority can be specified, e.g., on a 1 to 10 scale with 1 being the highest and 10 being the lowest priority.

The Reprogramming Operations Status can be set to "Scheduled" upon creating a new record. The Reprogramming Operation Status can then be changed to "Pending" upon transmitting a Reprogramming Message to the corresponding terminal. The Reprogramming Operation Status can be finally set to "Complete" upon receiving a Terminal Status Message confirming the completion of the Reprogramming Operation.

For every record in Table 555 with status different from "Complete", interface node 100 can build a reprogramming message to a particular terminal identified by the Terminal ID.

Interface node 100 can be configured so that database 1094 can be modified by receipt of commands initiated by a user using a user interface of interface node 100. A user of interface node 100 using a user interface can enter commands causing a new row to be appended to table 540. In one embodiment, system 1000 can be configured so that if database 1090 has an entry corresponding to the just docked terminal 100 and the update status indicates that the reprogramming designated by that row has not been completed for that terminal, interface node 100 builds a reprogramming message for that particular terminal ID.

In one embodiment, EIR terminal interface node 100 can also utilize the information determined by querying the Terminal Status Database 1090 to determine whether a docked EIR terminal satisfies a terminal identifying condition specified by the Terminal Reprogramming Database 1094. With further reference to FIG. 5a, a Terminal Status Database 1090 can take the form shown in FIG. 5a. Database 1090 can comprise a Terminal Configuration Table, a Hardware Component Configuration Table, and a Software Component Configuration Table.

Referring back to FIG. 2a, at step 2018, EIR terminal interface node 100 can build a Terminal Reprogramming Message 2009 responsively to the database query at step 2016 and can transmit the terminal reprogramming message to the EIR terminal 100 which originated the terminal status message. The method can then loop back to step 2010.

The terminal reprogramming message 2009 can contain commands and/or data directing an EIR terminal to upgrade its software and/or update its configuration. Terminal Reprogramming Message 2009 can include the following information:

1. EIR terminal unique identifier, e.g., manufacturer's serial number.
2. Zero or more binary files. A binary file can contain software code to be executed by the EIR terminal.
3. Zero or more data files. A data file can contain EIR terminal software configuration parameters; a data file can be e.g., an XML file, or a text file containing a list of <name=value> configuration parameter pairs.
4. Zero or more script files. A script file can contain, e.g., a sequence of commands to be executed by the EIR terminal in order to effectuate the software upgrade and/or configuration update.
5. A message to be displayed to the EIR terminal operator.
6. Time of executing the one or more script files and/or condition upon satisfying which the EIR terminal should execute the one or more script files.

Upon processing a Terminal Reprogramming Message, an EIR terminal 110 can transmit to EIR terminal interface node 100 a new terminal status message which would be received in the message reading loop comprising steps 2010-2012 of the present method.

Referring again to system 1000, system 1000 can be configured so that either or both of resource network 150 and interface node 100 can be configured to include user interfaces enabling an administrator to specify reprogramming files such as binary files and data files for transmission to one or more EIR terminals 110. Data of a reprogramming database 1094 can be modified either by way of commands input by a user of an interface node 100 or by way of messages built at the resource network 150 by way of commands input by an operator at the resource network 150, or by a software program processing messages received from an external system.

Figure 6A:
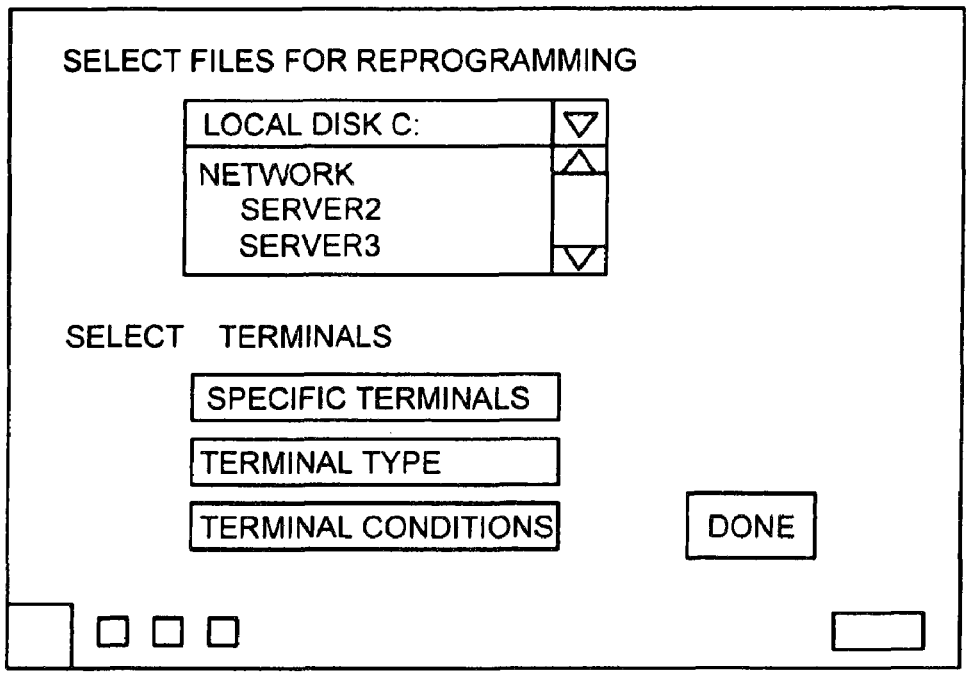
FIG. 6a illustrates a user interface by means of which a user can configure the resource network to perform the fleet management tasks and/or generate fleet management reports.

A user interface for running at interface node 100 has been described in connection with FIG. 6a. The interface node operator can select one or more reprogramming files from the local disk or from the resource network 150. Then the operator can further specify one or more terminals to which the selected files will be transmitted, and initiate the transmission of the reprogramming messages to the selected terminals by pressing the "Done" button.

Figure 6B:
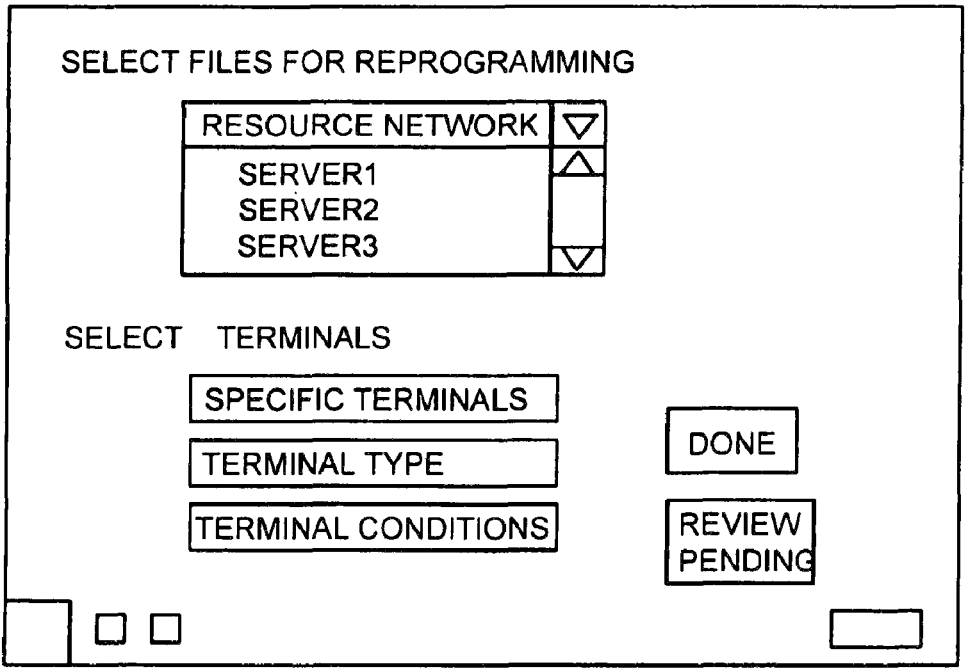
FIG. 6b illustrates a user interface by means of which a user can configure EIR terminal interface node.

A user interface for running at the resource network 150 is shown and described at FIG. 6*b*. The resource network operator can select one or more reprogramming files from one of the computers 140*a*-140*z* on the resource network 150. Then the operator can further specify one or more terminals to which the selected files will be transmitted, and initiate the transmission of the reprogramming information messages to an interface node by pressing the "Done" button.

FIG. 2*b* illustrates a flow diagram of a sample implementation of the execution thread responsible for processing reprogramming information messages received by EIR terminal interface node 100 from the resource network 150 of FIG. 1*a*. The thread can be initiated upon the EIR terminal interface node being powered-up and initialized. In the embodiment of FIG. 2*b* there is described a particular method wherein a reprogramming information message is received by interface node 100 prior to any reprogramming files and when the reprogramming information file message is processed to determine if files corresponding to the file information message have been previously cached. It will be understood, however, that system 1000 need not incorporate such caching functionality.

The resource network 150 can have a user interface configured as described in connection with FIG. 6*b* allowing its operator to specify the software upgrades and terminal updates to be performed, selecting the target EIR terminals by the EIR terminal unique identifier or by other EIR terminal attributes, including a terminal identifier (terminal ID, e.g., a serial number), type, presence or status of specific hardware components, etc. The resource network 150 can also be configured to generate reprogramming information messages automatically based on the input that the resource network can receive from external systems (e.g., from the manufacturer's software upgrade management system). EIR terminal interface node can be configured to receive terminal reprogramming messages from the resource network and can process such messages to modify Terminal Reprogramming Database 1094.

To minimize the network traffic between the resource network and EIR terminal interface node, the resource network can be configured to transmit to interface node 100 terminal reprogramming information containing unique file names rather than the reprogramming files (e.g., binary files, script files, configuration data files) themselves. EIR terminal interface node 100 can be configured to cache all the terminal reprogramming files in the local file system, and only request a terminal reprogramming file to be transmitted by the resource network when the file can not be found in the local file system of EIR terminal interface node 100.

Reprogramming information messages that can be received by interface node 100 from resource network 150 can include reprogramming file identifier messages and reprogramming file messages. An interface node 100 can receive a reprogramming file identifier message, process the message to determine if the identified file or files have been previously cached and can conditionally request a file or files identified by a reprogramming file identifier message on the condition that interface node 100 determines that the file or files requested have not been previously cached.

Referring to FIG. 2*b*, at step 2210, EIR terminal interface node 100 reads incoming messages from the resource network.

At step 2220, EIR terminal interface node 100 ascertains whether a reprogramming file identifier message has been received. If yes, the processing continues at step 2230; otherwise the method branches to step 2260.

A reprogramming file identifier message can include the following information:
1. Terminal identifying information, e.g., a terminal unique identifier, or a reprogramming condition. A reprogramming condition can be specified, e.g., by one or more <operand=value> statements, wherein the operand can be, for example, terminal ID, terminal type, component type, component status, etc. If more than one <operand=value> condition is used to specify the terminal identifying information, then the sequential number of the condition can be specified, and the conditions can be joined by AND or OR logical operations, e.g., <component type=battery> AND <component status=1>.
2. Zero or more identifiers of binary files. A binary file can contain software code to be executed by the EIR terminal.
3. Zero or more data files. A data file can contain EIR terminal software configuration parameters; a data file can be e.g., an XML file, or a text file containing a list of <name=value> configuration parameter pairs.
4. Zero or more identifiers of script files. A script file can contain, e.g., a sequence of commands to be executed by the EIR terminal in order to effectuate the software upgrade and/or configuration update.

At step 2230, EIR terminal interface node 100 modifies Terminal Reprogramming Database 1094 by appending to Table 540 data extracted from the reprogramming file identifier message.

At step 2240, EIR terminal interface node 100 ascertains whether all files specified in the reprogramming file identifier message exist in the local file system. If yes, the method loops back to step 2210; otherwise, the processing continues at step 2250.

At step 2250, EIR terminal interface node queues for transmission to resource network 150 a message requesting the files specified in the reprogramming file identifier message received at step 2220 and missing from the local file system. Then the method loops back to step 2210.

At step 2260, EIR terminal interface node ascertains whether a reprogramming file message has been received. If yes, the processing continues at step 2270; otherwise the method loops back to step 2210.

At step 2270, EIR terminal interface node stores the received one or more files in the local file system. The method loops back to step 2210.

Figure 3:
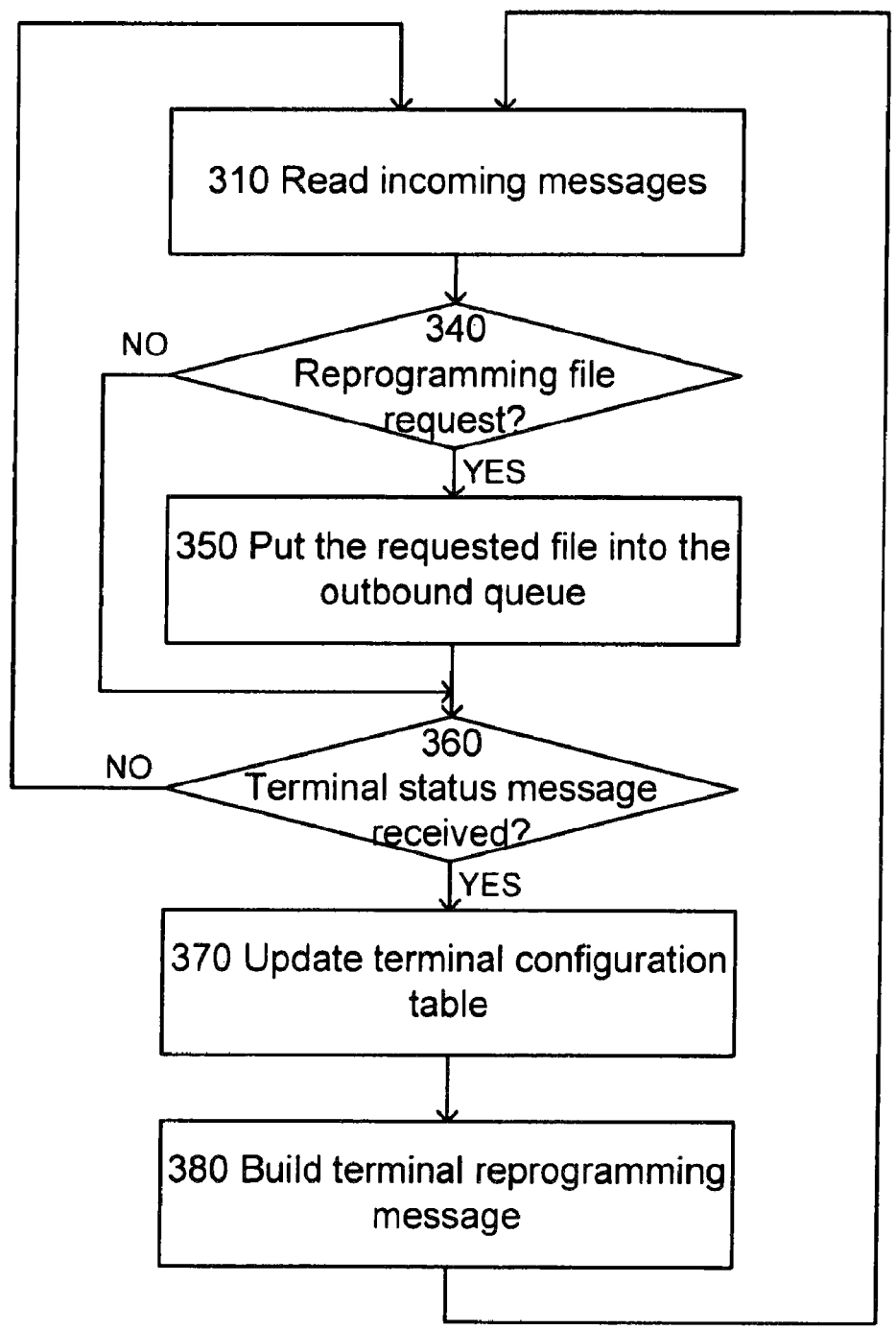
FIG. 3 illustrates a flow diagram of a sample implementation of the execution thread responsible for processing the messages received by the resource network from EIR terminal interface node.

FIG. 1 illustrates processing that can be carried out by one or more resource network computers 140. FIG. 3 is a flow diagram illustrating a sample implementation of the execution thread responsible for processing the messages received by the resource network 150 of FIG. 1*a* from EIR terminal interface node 100 of FIG. 1*a*. The thread can be initiated upon the resource network computer power-up and initialization.

In one embodiment, the resource network 150 can be configured to transmit a reprogramming file to EIR terminal interface node 100 responsive to receiving a reprogramming file request. In one embodiment, the reprogramming file request can be represented by a reprogramming request message.

In the embodiment shown in FIG. 3, the reprogramming file request can be represented by a terminal status message. The resource network can be further configured to update a terminal configuration record in the EIR terminal fleet management database responsive to receiving a terminal status message.

The interface node can communicate with the resource network using the Service Oriented Architecture Protocol (SOAP), Open Database Connectivity (ODBC) protocol, and/or a proprietary application level protocol.

In another embodiment, the resource network 150 can initiate the communication with the interface node by transmitting one or more reprogramming information messages.

A skilled artisan would appreciate the fact that the functionality provided by the embodiment with the resource network initiating the communication can be implemented employing the request-response embodiment, where the interface node transmits the reprogramming file requests with a desired frequency. This can be useful, e.g., in a situation where a local network security policy prevents any external entity (including the resource network 150) from opening a Transmission Control Protocol (TCP) connection to the hosts on the local network (including the interface node).

Referring now to FIG. 3, at step 310, the resource network computer reads incoming messages from EIR terminal interface node 100 of FIG. 1*a*. Processing continues at step 340.

At step 340, the resource network computer ascertains whether a reprogramming file request has been received. If yes, the processing continues at step 350; otherwise the method branches to step 360.

At step 350, the resource network computer queues for transmission to EIR terminal interface node a terminal reprogramming file message containing one or more files requested by EIR terminal interface node.

At step 360, the resource network computer ascertains whether a terminal status message has been received. If yes, the processing continues at step 370; otherwise, the method loops back to step 310.

At step 370, the resource network computer parses the incoming terminal status message and updates terminal configuration table of the EIR terminal fleet management database with the EIR terminal configuration information. Processing continues at step 380.

At step 380, the resource network computer builds queues for transmission of a terminal reprogramming message to EIR terminal interface node. The method loops back to step 310.

Figure 4:
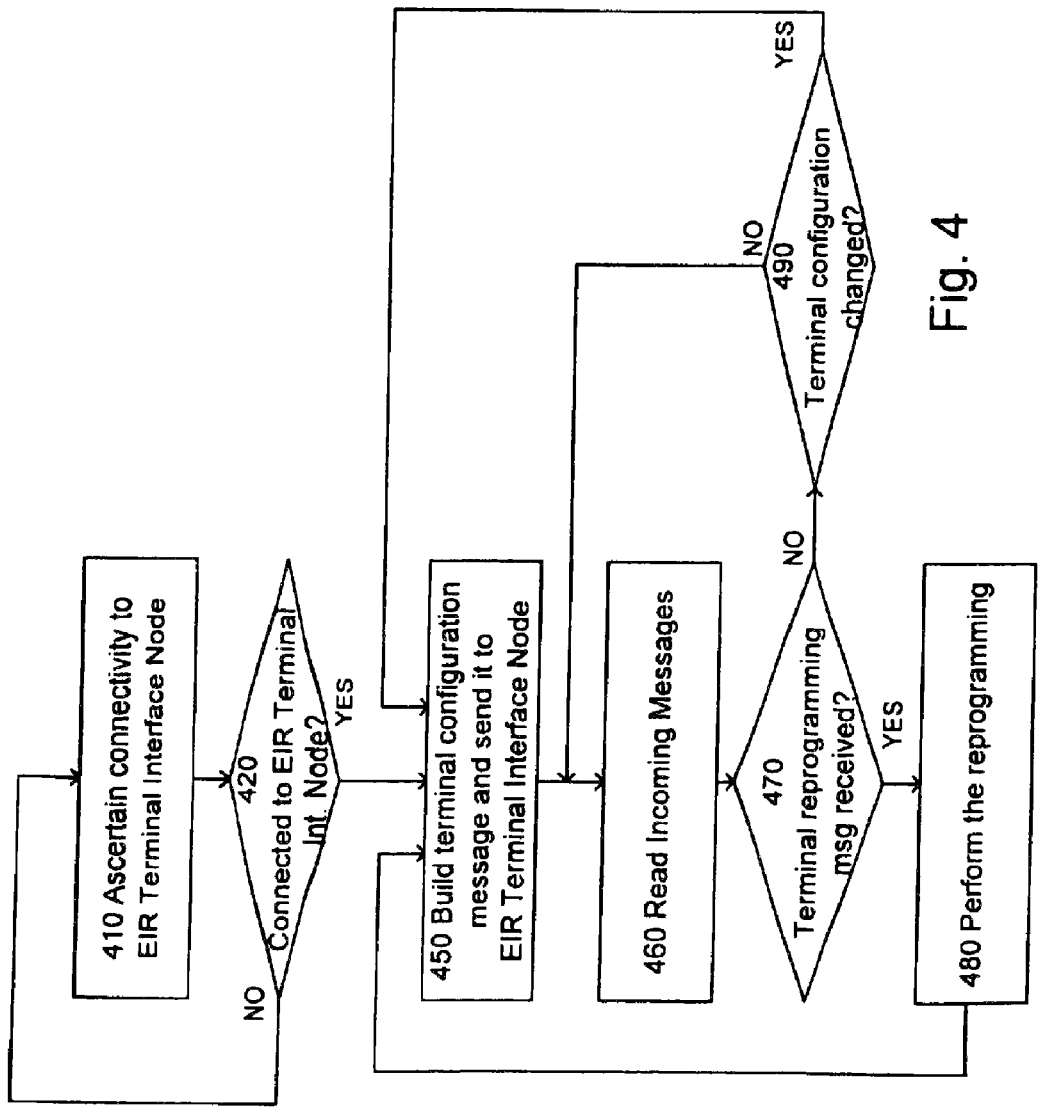
FIG. 4 illustrates a flow diagram a sample implementation of the execution thread responsible for communications to the EIR terminal interface node by an EIR terminal member of a managed fleet.

FIG. 4 illustrates a flow diagram of a sample implementation of the execution thread responsible for communications to the EIR terminal interface node by an EIR terminal member of a managed fleet.

An EIR terminal can be configured, periodically at the expiration of a pre-set time-out, and/or every time an EIR terminal is powered up, or engaged with a docking station, to ascertain the connectivity to the EIR terminal interface node. An EIR terminal can be further configured, upon ascertaining that the connectivity to the EIR terminal interface node exists, to upload the data collected by the EIR terminal since the last data upload operation (e.g., during the last work shift). An EIR terminal can be further configured, upon completing the data upload operation, to transmit a terminal status message to the EIR terminal interface node. An EIR terminal can be further configured, responsive to receiving a terminal reprogram message, to perform the directed updates and transmit a terminal status message reflecting the changed status to EIR terminal interface node. An EIR terminal can also be configured to periodically (e.g., within the message reading loop) ascertain whether the terminal configuration and/or status has been changed and transmit a terminal status message every time a terminal configuration change has been detected. An interface node can be configured to transmit terminal reprogramming messages only to docked terminals.

Step 410 of testing a connection to EIR terminal interface node 100 of FIG. 1*a* can be performed at least periodically at the expiration of a pre-set time-out, and/or every time an EIR terminal is powered up, or engaged with a docking station 120. Processing continues at step 420.

At step 420, the EIR terminal 100 ascertains whether it has acquired a connection to EIR terminal interface node. If yes, the processing continues at step 450; otherwise, the method loops back to step 410.

At step 450, EIR terminal builds a terminal status message and transmits it to EIR terminal interface node. Processing continues at step 460.

At step 460, EIR terminal reads the incoming messages from EIR terminal interface node. Processing continues at step 470.

At step 470, the method ascertains whether a terminal reprogramming message has been received. If yes, the processing continues at step 480; otherwise, the method branches to step 490.

At step 480, EIR terminal parses the incoming terminal reprogramming message and performs the updates specified in the message. EIR terminal can execute the update script extracted from the message immediately, or schedule it for execution at the time specified in the reprogramming message or upon satisfying the condition specified within the message. The update script can include instructions resetting the EIR terminal upon completing the reprogramming operation. The method loops back to step 450.

At step 490, EIR terminal ascertains whether the terminal configuration has been changed since the last terminal status message was sent to EIR terminal interface node. If yes, the method loops back to step 450; otherwise, the method loops back to step 460.

FIG. 5 illustrates an example of the structure of the tables of EIR terminal status and reprogramming databases.

Referring to Terminal Status Database shown in FIG. 5*a*, Terminal Status Database 1090 can include Terminal Configuration Table 510, Hardware Component Configuration Table 520, and Software Component Configuration Table 530. Terminal Configuration Table 510 can contain a plurality of terminal configuration records; each of those records can include the following fields: Terminal ID, Terminal Type, Hardware Component Record Pointer, and Software Component Record Pointer.

Hardware Component Configuration Table 520 can contain a plurality of hardware component configuration records; each of those records can include the following fields: Component ID, Component Type, and Component Status.

Software Component Configuration Table 530 can contain a plurality of software component configuration records. Each of those records can include the following fields: Component ID, Component Name, Component Version, and Configuration Parameters.

Referring now to Terminal Reprogramming Database 1094 shown in FIG. 5*b*, Terminal Reprogramming Database can include Scheduled Terminal Reprogramming Table 540, Reprogramming Conditions Table 550, and Pending Terminal Reprogramming Table 555.

Scheduled Terminal Reprogramming Table 540 can contain a plurality of scheduled terminal reprogramming records containing an EIR terminal identifying information and at least one of: a Binary File, a Data File, a Script File. Each of the terminal reprogramming records can include the following fields: Condition ID, Script File Name, Binary File Name, Data File Name, and Reprogramming Operation Priority.

Script File Name is the name of a file in a file system local to or accessible by resource network 150. A script file can contain, e.g., a sequence of commands to be executed by the EIR terminal in order to perform the software upgrade or configuration update.

Binary File Name is the name of a file in a file system local to or accessible by resource network 150. A binary file can contain a software code to be executed by the EIR terminal.

Data File Name is the name of a file in a file system local to or accessible by resource network 150. A data file can contain software configuration parameters. A data file can be, e.g., an XML file, or a text file containing a list of <name=value> configuration parameter pairs.

Reprogramming Conditions Table 550 can contain a plurality of reprogramming condition records containing terminal identifying information for use by interface node 100 in determining whether a reprogramming message is to be built for a particular EIR terminal. Such terminal identifying information can be specified, e.g., by one or more <operand=value> conditions wherein the operand can be for example, terminal ID, terminal type, component type, component status, etc. If more than one <operand=value> condition is used to specify the terminal identifying information, then the sequential number of the condition can be stored in the sequence number column, and the conditions can be joined by AND or OR logical operations specified in the operation column, e.g., <component type=battery> AND <component status=1>.

Pending Terminal Reprogramming Table 555 can contain a plurality of pending terminal reprogramming records. Each of those records can include the following fields: Terminal ID, Script File Name, Binary File Name, Data File Name, Reprogramming Operation Priority, and Reprogramming Operation Status.

A software process running on interface node 100 can be configured so that for every record in Scheduled Terminal Reprogramming Table 540, one or more conditions can be extracted from Reprogramming Conditions Table 550, with the Condition ID in the records extracted from Reprogramming Conditions Table 550 matching the Condition ID in the records of Scheduled Terminal Reprogramming Table 540. If more than one condition is extracted from Reprogramming Conditions Table 550, the extracted conditions can be ordered according to the value of the Sequence Number column of Reprogramming Conditions Table 550, and joined together with the logical operations specified in the Operation column of Reprogramming Conditions Table 550. The software process running on interface node 100 can be further configured so that for every terminal satisfying the one or more conditions extracted, a new record can be created in Pending Terminal Reprogramming Table 555.

The reprogramming operations status can be set to "Scheduled" upon creating a new record. The reprogramming operation status can then be changed to "Pending" upon transmitting a reprogramming message to the corresponding terminal. The reprogramming operation status can be finally set to "Complete" upon receiving a terminal status message confirming the completion of the reprogramming operation.

For every record in Pending Terminal Reprogramming Table 555 with status different from "Complete", interface node 100 can build a reprogramming message to a particular terminal identified by the terminal ID.

A small sample of systems methods and apparatus that are described herein is as follows:

A1. An encoded information reading (EIR) terminal interface node for use in a data collection system having a plurality of EIR terminals, each EIR terminal of said plurality of EIR terminals having an EIR device selected from the group consisting of a barcode reading device, an RFID reading device, and a card reading device, said EIR interface node including one or more computers, each computer comprising a central processing unit, a memory, and at least one communication interface;

wherein said EIR terminal interface node is communicatively coupled to a plurality of EIR terminals, each EIR terminal of said plurality of EIR terminals being engageable to a docking station;

wherein said EIR terminal interface node is communicatively coupled to a reprogramming database, said reprogramming database containing a plurality of reprogramming records, each reprogramming record of said plurality of reprogramming records containing EIR terminal identifying information and at least one of: a binary file identifier, a data file identifier, a script file identifier;

wherein said EIR terminal interface node builds and transmits a reprogramming message to one or more EIR terminals, said reprogramming message including at least one of: a binary file, a data file, a script file;

wherein said EIR terminal interface node utilizes information determined by querying said reprogramming database when building said reprogramming message;

wherein said binary file contains a software code to be executed by an EIR terminal;

wherein said data file contains EIR terminal software configuration parameters; and wherein said script file contains a sequence of commands to be executed by an EIR terminal.

A2. The EIR terminal interface node of claim A1, wherein said EIR terminal interface node is communicatively coupled to a file system; wherein said reprogramming database stores a plurality of reprogramming file identifiers identifying reprogramming files stored in said file system.

A3. The EIR terminal interface node of claim A1, wherein said EIR terminal interface node is configured to run a Dynamic Host Configuration Protocol (DHCP) server software program to service DHCP requests for dynamic assignment of IP addresses, said requests being initiated by one or more EIR terminals of said plurality of EIR terminals.

A4. The EIR terminal interface node of claim A1, wherein said EIR terminal interface node is further configured to query a docked EIR terminal for a list of active communication interfaces;

wherein at least one EIR terminal of said plurality of EIR terminals is configured to reply to said active interface list request with a list of its active interfaces, said list of active interfaces including interface types and IP addresses; and wherein said EIR terminal interface node is further configured, upon receiving said list of an EIR terminal's active interfaces, to perform further communication with said terminal over a communication interface selected from said list of active interfaces, said communication interface not associated with a docking station to which said terminal is currently engaged.

A5. The EIR terminal interface node of claim A1, further including a user interface enabling a user of said EIR terminal interface node to modify said reprogramming database; wherein said EIR terminal interface node builds said reprogramming message responsively to a user action via said user interface.

A6. The EIR terminal interface node of claim A1, wherein said EIR terminal interface node builds said reprogramming message responsively to receiving a reprogramming request from a certain EIR terminal of said plurality of terminals.

A7. The EIR terminal interface node of claim A1, wherein said EIR terminal interface node is configured so that said EIR terminal interface node transmits said reprogramming message to a certain EIR terminal responsively to said certain EIR terminal being docked in a docking station.

A8. The EIR terminal interface node of claim A1, wherein said EIR terminal interface node is configured so that said EIR terminal interface node transmits said reprogramming message to a certain EIR terminal only during a specified time frame.

A9. The EIR terminal interface node of claim A1, wherein said terminal identifying information is selected from the group consisting of a terminal unique identifier and a reprogramming condition.

A10. The EIR terminal interface node of claim A1, wherein said reprogramming message further specifies one of time of executing said script file condition to be satisfied to trigger the executing of said script file.

B1. An encoded information reading (EIR) terminal interface node for use in a data collection system having a plurality of EIR terminals, each EIR terminal of said plurality of EIR terminals having an EIR device selected from the group consisting of a barcode reading device, an RFID reading device, and a card reading device, said EIR interface node including one or more computers, each computer comprising a central processing unit, a memory, and at least one communication interface;

wherein said EIR terminal interface node is communicatively coupled to a plurality of EIR terminals, each EIR terminal of said plurality of EIR terminals being engageable to a docking station;

wherein said EIR terminal interface node is communicatively coupled to a reprogramming database, said reprogramming database containing a plurality of reprogramming records, each reprogramming record of said plurality of reprogramming records containing an EIR terminal identifying information and at least one of: a binary file identifier, a data file identifier, a script file identifier;

wherein said EIR terminal interface node builds and transmits a reprogramming message to one or more EIR terminals, said reprogramming message including at least one of: a binary file, a data file, a script file;

wherein said EIR terminal interface node utilizes information determined by querying said reprogramming database when building said reprogramming message;

wherein said binary file contains software code to be executed by an EIR terminal;

wherein said data file contains EIR terminal software configuration parameters;

wherein said script file contains a sequence of commands to be executed by an EIR terminal;

wherein said EIR terminal interface node further includes a user interface enabling a user of said EIR terminal interface node to modify said reprogramming database; and wherein said EIR terminal interface node is further configured so that said EIR terminal interface node modifies said reprogramming database responsively to receiving a reprogramming information message from a resource network.

B2. The EIR terminal interface node of claim B1, wherein said EIR terminal interface node is communicatively coupled to a file system; wherein said reprogramming database stores a plurality of reprogramming file identifiers identifying reprogramming files stored in said file system.

B3. The EIR terminal interface node of claim B1, wherein said EIR terminal interface node further includes a user interface enabling a user of said EIR terminal interface node to specify one of: Domain Name System (DNS) name of at least one computer on said resource network, IP address of at least one computer on said resource network.

B4. The EIR terminal interface node of claim B1, wherein said EIR terminal interface node communicates with said resource network using one of: Service Oriented Architecture Protocol (SOAP), Open Database Connectivity (ODBC) protocol, a proprietary application level protocol.

B5. The EIR terminal interface node of claim B1, wherein said EIR terminal interface node is configured to receive one or more said reprogramming information messages from said resource network responsively to transmitting a request to said resource network.

B6. The EIR terminal interface node of claim B1, wherein said EIR terminal interface node is configured to receive one or more said reprogramming information messages from said resource network responsively to transmitting a terminal status message to said resource network.

B7. The EIR terminal interface node of claim B1, wherein said EIR terminal interface node is configured, responsively to transmitting a request to a computer on said resource network, to receive a re-direction response including a re-direction address; and wherein said EIR terminal interface node is further configured to receive said reprogramming information message responsively to transmitting request to said re-direction address.

B8. The EIR terminal interface node of claim B1, wherein said EIR terminal interface node is configured to allow a local administrator to specify a processing workflow to be executed upon a reprogramming message received from said resource network before performing a modification of said reprogramming database.

C1. An encoded information reading (EIR) terminal interface node for use in a data collection system having a plurality of EIR terminals, each EIR terminal of said plurality of EIR terminals having an EIR device selected from the group consisting of a barcode reading device, an RFID reading device, and a card reading device, said EIR interface node including one or more computers, each computer comprising a central processing unit a memory, and at least one communication interface;

wherein said EIR terminal interface node is communicatively coupled to a plurality of EIR terminals, each EIR terminal of said plurality of EIR terminals being engageable to a docking station;

wherein said EIR terminal interface node is communicatively coupled to a reprogramming database, said reprogramming database containing a plurality of reprogramming records, each reprogramming record of said plurality of reprogramming records containing an EIR terminal identifying information and at least one of: a binary file identifier, a data file identifier, a script file identifier;

wherein said EIR terminal interface node is communicatively coupled to a terminal status database, said terminal status database containing a plurality of terminal status records;

wherein said EIR terminal interface node builds and transmits a reprogramming message to one or more EIR terminals, said reprogramming message including at least one of: a binary file, a data file, a script file;

wherein said EIR terminal interface node utilizes information determined by querying said reprogramming database and said terminal status database when building said reprogramming message;

wherein said binary file contains software code to be executed by an EIR terminal;

wherein said data file contains EIR terminal software configuration parameters; and wherein said script file contains a sequence of commands to be executed by an EIR terminal.

C2. The EIR terminal interface node of claim C1, wherein said EIR terminal interface node is communicatively coupled to a file system; wherein said reprogramming database stores a plurality of reprogramming file identifiers identifying reprogramming files stored in said file system.

C3. The EIR terminal interface node of claim C1, further including a user interface enabling a user of said EIR terminal interface node to modify said reprogramming database; wherein said EIR terminal interface node builds said reprogramming message responsively to a user action via said user interface.

D1. An encoded information reading (EIR) terminal interface node for use in a data collection system having a plurality of EIR terminals, each EIR terminal of said plurality of EIR terminals having an EIR device selected from the group consisting of a barcode reading device, an RFID reading device, and a card reading device, said EIR interface node including one or more computers, each computer comprising a central processing unit, a memory, and at least one communication interface;

wherein said EIR terminal interface node is communicatively coupled to a plurality of EIR terminals, each EIR terminal of said plurality of EIR terminals being engageable to a docking station;

wherein said EIR terminal interface node builds and transmits a reprogramming message to one or more EIR terminals, said reprogramming message including at least one reprogramming file;

wherein said EIR terminal interface node is further configured to receive a reprogramming information message from a resource network, said reprogramming information message containing identifiers of one or more reprogramming files;

wherein said EIR terminal interface node is further configured to request the transmission by a resource network of one or more reprogramming files identified in said reprogramming information message responsively to a determination that said one or more reprogramming files have not been previously received and stored by said EIR terminal interface node.

D2. The EIR terminal interface node of claim D1, wherein said EIR terminal interface node is configured to receive one or more said reprogramming information messages from said resource network responsively to transmitting a request to said resource network.

D3. The EIR terminal interface node of claim D1, wherein said EIR terminal interface node is configured to receive one or more said reprogramming information messages from said resource network responsively to transmitting a terminal status message to said resource network.

D4. The EIR terminal interface node of claim D1, wherein said EIR terminal interface node is configured, responsively to transmitting a request to a computer on said resource network, to receive a re-direction response including a re-direction address; wherein said EIR terminal interface node is further configured to receive said reprogramming information message responsively to transmitting request to said re-direction address.

E1. An encoded information reading (EIR) terminal interface node for use in a data collection system having a plurality of EIR terminals, each EIR terminal of said plurality of EIR terminals having an EIR device selected from the group consisting of a barcode reading device, an RFID reading device, and a card reading device, said EIR interface node including one or more computers, each computer comprising a central processing unit, a memory, and at least one communication interface;

wherein said EIR terminal interface node is communicatively coupled to a plurality of EIR terminals, each EIR terminal of said plurality of EIR terminals being engageable to a docking station;

wherein said EIR terminal interface node is communicatively coupled to a reprogramming database, said reprogramming database containing a plurality of reprogramming records, each reprogramming record of said plurality of reprogramming records containing an EIR terminal identifying information and at least one reprogramming file identifier;

wherein said EIR terminal interface node builds and transmits a reprogramming message to one or more EIR terminals, said reprogramming message including at least one reprogramming file;

wherein said EIR terminal interface node further includes a user interface enabling a user of said EIR terminal interface node to modify said reprogramming database;

wherein said EIR terminal interface node is configured so that said EIR interface node can transmit one or more reprogramming files to a certain one of said plurality of EIR terminals responsively to a received reprogramming request from said certain one of said EIR terminals;

wherein said EIR terminal interface is configured to monitor a docked or undocked status of each of said plurality of EIR terminals; and wherein said EIR terminal status is configured to that said EIR interface node is restricted from transmitting said reprogramming files to a certain one of said EIR terminals unless said EIR terminal is determined to be docked in one of said docking stations.

F1. A method for reprogramming a portable encoded information reading (EIR) terminal operating within a fleet of encoded information reading terminals, said method comprising the steps of:

providing at a local facility at a location external to said portable EIR terminal a reprogramming database including information respecting one or more reprogramming files, said one or more files intended for transmittal to one or more EIR terminals, the providing step including the step of providing said reprogramming database so that said reprogramming database can be updated responsively to receiving a reprogramming information message from a location remote from said local facility;

further providing at said local facility at a location external to said portable EIR terminal a terminal status database for storing information respecting a condition status of terminals of said fleet of terminals, the further providing step including the step of providing the terminal status database so that said terminal status database can be modified responsively to status messages being received from said terminals of said fleet of encoded information reading terminals;

receiving a reprogramming request from said encoded information reading terminal;

querying said programming database and said terminal status database responsively to said receiving of said reprogramming request;

utilizing information determined by said querying of said programming database and said terminal status database to build a reprogramming message for transmitting to said encoded information reading terminal; and transmitting to said encoded information reading terminal said reprogramming message.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

We claim:

1. A method for reprogramming one or more encoded information reading (EIR) terminals by a terminal interface node, said method comprising the steps of:

said terminal interface node selecting at least one EIR terminal satisfying a reprogramming condition;

said terminal interface node selecting a reprogramming file and a priority level corresponding to said reprogramming condition;

said terminal interface node transmitting said reprogramming file and said priority level to said at least one EIR terminal.

2. The method of claim 1, wherein said reprogramming condition includes at least two statements joined by a logical operation.

3. The method of claim 1, further comprising the step of said terminal interface node selecting said reprogramming condition by querying a database, preceding said step of selecting at least one EIR terminal.

4. The method of claim 1, further comprising the step of said terminal interface node ascertaining completion of higher priority operations, preceding said step of transmitting said reprogramming file.

5. The method of claim 1, wherein said reprogramming file is provided by one of: a binary file, a data file, a script file.

6. The method of claim 1, wherein said step of transmitting said reprogramming file is performed responsive to said at least one EIR terminal establishing a communication with said terminal interface node.

7. The method of claim 1, wherein said step of transmitting said reprogramming file is performed responsive to said at least one EIR terminal establishing a communication with said terminal interface node upon engaging to a docking station.

8. The method of claim 1, further comprising the steps of:

said terminal interface node querying a docked EIR terminal for a list of active communication interfaces;

said docked EIR terminal transmitting a list of active interfaces, said list of active interfaces including interface types and IP addresses; and responsive to receiving from said docked EIR terminal said list of active interfaces, said terminal interface node performing further communication with said EIR terminal over a communication interface selected from said list of active interfaces, preceding said step of transmitting said reprogramming file.

9. The method of claim 1, further comprising the steps of:

said terminal interface node querying a docked EIR terminal for a list of active communication interfaces;

said docked EIR terminal transmitting a list of active interfaces, said list of active interfaces including interface types and IP addresses; and responsive to receiving from said docked EIR terminal said list of active interfaces, said terminal interface node performing further communication with said EIR terminal over a communication interface selected from said list of active interfaces, said communication interface not associated with a docking station to which said at least one EIR terminal is currently engaged, preceding said step of transmitting said reprogramming file.

10. The method of 1, further comprising the step of said terminal interface node designating a corresponding reprogramming operation as completed responsive to receiving from said at least one EIR terminal a terminal status message confirming completion of said reprogramming operation.

* * * * *